United States Patent
Jadon et al.

(10) Patent No.: US 11,023,315 B1
(45) Date of Patent: Jun. 1, 2021

(54) TECHNIQUES FOR SUPPORTING ERASURE CODING WITH FLASH MEMORY CONTROLLER

(71) Applicant: Radian Memory Systems, Inc., Calabasas, CA (US)

(72) Inventors: Mike Jadon, Manhattan Beach, CA (US); Craig Robertson, Simi Valley, CA (US); Robert Lercari, Thousand Oaks, CA (US)

(73) Assignee: Radian Memory Systems, Inc., Calabasas, CA (US)

( * ) Notice: Subject to any disclaimer, the term of this patent is extended or adjusted under 35 U.S.C. 154(b) by 125 days.

(21) Appl. No.: 16/591,735

(22) Filed: Oct. 3, 2019

Related U.S. Application Data

(63) Continuation of application No. 15/211,927, filed on Jul. 15, 2016, now Pat. No. 10,552,058.
(Continued)

(51) Int. Cl.
*G06F 11/10* (2006.01)
*G06F 3/06* (2006.01)

(52) U.S. Cl.
CPC ........ *G06F 11/1068* (2013.01); *G06F 3/0619* (2013.01); *G06F 3/0647* (2013.01);
(Continued)

(58) Field of Classification Search
CPC .. G06F 11/1068; G06F 3/0619; G06F 3/0647; G06F 3/0679; G06F 3/0689; G06F 3/0659
See application file for complete search history.

(56) References Cited

U.S. PATENT DOCUMENTS

| 5,568,423 A | 10/1996 | Jou et al. |
| 5,652,857 A | 7/1997 | Shimoi et al. |

(Continued)

FOREIGN PATENT DOCUMENTS

WO 2009100149 A1 8/2009

OTHER PUBLICATIONS

U.S. Appl. No. 13/767,723, Kuzmin, Issued—U.S. Pat. No. 9,652,376.
(Continued)

*Primary Examiner* — Masud K Khan
(74) *Attorney, Agent, or Firm* — Marc P. Schuyler

(57) ABSTRACT

Processing functions are offloaded to a memory controller for nonvolatile memory by a host in connection with write data. The nonvolatile memory executes these functions, producing processed data that must be written into memory; for example, the offloaded functions can include erasure coding, with the nonvolatile memory controller generating redundancy information that must be written into memory. The memory controller holds this information in internal RAM and then later writes this information into nonvolatile memory according to dynamically determined write time and/or destinations selected by the host, so as to not collide with host data access requests. In one embodiment, the memory is NAND flash memory and the memory controller is a cooperative memory controller that permits the host to schedule concurrent operations in respective, configurable virtual block devices which have been configured by the host out of a pool of structural flash memory structures managed by the memory controller.

25 Claims, 12 Drawing Sheets

Related U.S. Application Data

(60) Provisional application No. 62/241,429, filed on Oct. 14, 2015, provisional application No. 62/199,969, filed on Jul. 31, 2015, provisional application No. 62/199,970, filed on Jul. 31, 2015, provisional application No. 62/194,172, filed on Jul. 17, 2015.

(52) U.S. Cl.
CPC .......... *G06F 3/0659* (2013.01); *G06F 3/0679* (2013.01); *G06F 3/0689* (2013.01)

(56) References Cited

U.S. PATENT DOCUMENTS

| | | |
|---|---|---|
| 5,860,082 A | 1/1999 | Smith et al. |
| 6,134,631 A | 10/2000 | Jennings, III |
| 7,096,378 B2 | 8/2006 | Stence et al. |
| 7,339,823 B2 | 3/2008 | Nakayama et al. |
| 7,404,031 B2 | 7/2008 | Oshima |
| 7,581,078 B2 | 8/2009 | Ware |
| 7,702,846 B2 | 4/2010 | Nakanishi et al. |
| 7,710,777 B1 | 5/2010 | Mintierth |
| 7,752,381 B2 | 7/2010 | Wong |
| 7,801,561 B2 | 9/2010 | Parikh et al. |
| 7,818,489 B2 | 10/2010 | Karamcheti et al. |
| 7,836,244 B2 | 11/2010 | Kim et al. |
| 7,861,122 B2 | 12/2010 | Cornwell et al. |
| 7,941,692 B2 | 5/2011 | Royer et al. |
| 7,970,983 B2 | 6/2011 | Nochimowski |
| 7,991,944 B2 | 8/2011 | Lee et al. |
| 8,001,318 B1 | 8/2011 | Iyer |
| 8,024,545 B2 | 9/2011 | Kim et al. |
| 8,055,833 B2 | 11/2011 | Danilak et al. |
| 8,065,471 B2 | 11/2011 | Yana et al. |
| 8,065,473 B2 | 11/2011 | Ito et al. |
| 8,068,365 B2 | 11/2011 | Kim |
| 8,072,463 B1 | 12/2011 | Van Dyke |
| 8,074,022 B2 | 12/2011 | Okin et al. |
| 8,082,389 B2 | 12/2011 | Fujibayashi |
| 8,086,790 B2 | 12/2011 | Roohparvar |
| 8,347,042 B2 | 1/2013 | You |
| 8,572,331 B2 | 10/2013 | Shalvi |
| 9,229,854 B1 | 1/2016 | Kuzmin et al. |
| 9,335,939 B2 | 5/2016 | Bennett et al. |
| 9,400,749 B1 | 7/2016 | Kuzmin et al. |
| 9,519,578 B1 | 12/2016 | Kuzmin et al. |
| 9,542,118 B1 | 1/2017 | Lercari et al. |
| 9,588,904 B1 | 3/2017 | Lercari et al. |
| 9,652,376 B2 | 5/2017 | Kuzmin et al. |
| 9,710,377 B1 | 7/2017 | Kuzmin et al. |
| 9,727,454 B2 | 8/2017 | Kuzmin et al. |
| 9,785,572 B1 | 10/2017 | Lercari et al. |
| 10,445,229 B1 | 10/2019 | Kuzmin et al. |
| 10,552,058 B1 | 2/2020 | Jadon et al. |
| 10,552,085 B1 | 2/2020 | Chen et al. |
| 2003/0028733 A1 | 2/2003 | Tsunoda et al. |
| 2003/0065866 A1 | 4/2003 | Spencer |
| 2005/0144413 A1 | 6/2005 | Kuo et al. |
| 2006/0022171 A1 | 10/2006 | Maeda et al. |
| 2007/0058431 A1 | 3/2007 | Chung et al. |
| 2007/0233939 A1 | 10/2007 | Kim |
| 2007/0260811 A1 | 11/2007 | Merry, Jr. et al. |
| 2007/0283428 A1 | 12/2007 | Ma et al. |
| 2008/0082596 A1 | 4/2008 | Gorobets |
| 2008/0147964 A1 | 6/2008 | Chow et al. |
| 2008/0155204 A1 | 6/2008 | Qawami et al. |
| 2008/0189485 A1 | 8/2008 | Jung et al. |
| 2009/0036163 A1 | 2/2009 | Kimbrell |
| 2009/0046533 A1 | 2/2009 | Jo |
| 2009/0083478 A1 | 3/2009 | Kunimatsu |
| 2009/0089482 A1 | 4/2009 | Traister |
| 2009/0089490 A1 | 4/2009 | Ozawa et al. |
| 2009/0172219 A1 | 7/2009 | Mardiks |
| 2009/0172250 A1 | 7/2009 | Allen et al. |
| 2009/0172257 A1 | 7/2009 | Prins et al. |
| 2009/0198946 A1 | 8/2009 | Ebata |
| 2009/0254705 A1 | 10/2009 | Abali et al. |
| 2009/0271562 A1 | 10/2009 | Sinclair |
| 2009/0300015 A1 | 12/2009 | Kazan et al. |
| 2009/0327602 A1 | 12/2009 | Moore et al. |
| 2010/0019779 A1 | 1/2010 | Hinrichs |
| 2010/0042655 A1 | 2/2010 | Tse et al. |
| 2010/0083050 A1* | 4/2010 | Ohyama ............ G06F 11/1068 714/42 |
| 2010/0115172 A1 | 5/2010 | Gillingham et al. |
| 2010/0161882 A1 | 6/2010 | Stern et al. |
| 2010/0162012 A1 | 6/2010 | Cornwell et al. |
| 2010/0182838 A1 | 7/2010 | Kim et al. |
| 2010/0241866 A1 | 9/2010 | Rodorff |
| 2010/0262761 A1 | 10/2010 | Borchers et al. |
| 2010/0281230 A1 | 11/2010 | Rabii et al. |
| 2010/0287217 A1 | 11/2010 | Borchers et al. |
| 2010/0329011 A1 | 12/2010 | Lee et al. |
| 2011/0033548 A1 | 2/2011 | Kimmel et al. |
| 2011/0055445 A1 | 3/2011 | Gee et al. |
| 2011/0161784 A1 | 6/2011 | Sellinger et al. |
| 2011/0197023 A1 | 8/2011 | Iwamitsu et al. |
| 2011/0238943 A1 | 9/2011 | Devendran et al. |
| 2011/0296133 A1 | 12/2011 | Flynn et al. |
| 2011/0314209 A1 | 12/2011 | Eckstein |
| 2012/0033519 A1 | 2/2012 | Confalonieri et al. |
| 2012/0059972 A1 | 3/2012 | Chen |
| 2012/0066441 A1 | 3/2012 | Weingarten |
| 2012/0131381 A1 | 5/2012 | Eleftheriou |
| 2012/0204079 A1 | 8/2012 | Takefman et al. |
| 2013/0007343 A1 | 1/2013 | Rub |
| 2013/0013852 A1 | 1/2013 | Hou et al. |
| 2013/0019062 A1 | 1/2013 | Bennett et al. |
| 2013/0073816 A1 | 3/2013 | Sea et al. |
| 2013/0111295 A1 | 5/2013 | Li et al. |
| 2013/0124793 A1 | 5/2013 | Gyl et al. |
| 2013/0166825 A1 | 6/2013 | Kim et al. |
| 2013/0242425 A1 | 9/2013 | Zayas et al. |
| 2013/0290619 A1 | 10/2013 | Knight |
| 2013/0297852 A1 | 11/2013 | Fai et al. |
| 2014/0101371 A1 | 4/2014 | Nguyen et al. |
| 2014/0122781 A1 | 5/2014 | Smith et al. |
| 2014/0189209 A1 | 7/2014 | Sinclair et al. |
| 2014/0208004 A1 | 7/2014 | Cohen |
| 2014/0215129 A1 | 7/2014 | Kuzmin et al. |
| 2015/0113203 A1 | 4/2015 | Dancho et al. |
| 2015/0149789 A1 | 5/2015 | Sea et al. |
| 2015/0212938 A1 | 6/2015 | Chen et al. |
| 2015/0261456 A1 | 9/2015 | Alcantara et al. |
| 2015/0324264 A1 | 11/2015 | Vidypoornachy et al. |
| 2015/0347296 A1 | 12/2015 | Katte et al. |
| 2016/0018998 A1 | 1/2016 | Mohan et al. |
| 2016/0357462 A1 | 12/2016 | Nam et al. |
| 2016/0364179 A1 | 12/2016 | Tsai et al. |

OTHER PUBLICATIONS

U.S. Appl. No. 14/466,167, Kuzmin, Issued—U.S. Pat. No. 9,727,454.
U.S. Appl. No. 15/009,275, Kuzmin, Issued—U.S. Pat. No. 9,400,749.
U.S. Appl. No. 15/625,931, Kuzmin, on appeal.
U.S. Appl. No. 15/625,946, Kuzmin.
U.S. Appl. No. 14/047,193, Kuzmin, Issued—U.S. Pat. No. 9,229,854.
U.S. Appl. No. 14/951,708, Kuzmin, Issued—U.S. Pat. No. 9,519,578.
U.S. Appl. No. 15/346,641, Kuzmin, Issued—U.S. Pat. No. 9,710,377.
U.S. Appl. No. 16/570,922, Kuzmin, Issued—U.S. Pat. No. 10,445,229.
U.S. Appl. No. 16/570,922, Kuzmin.
U.S. Appl. No. 16/751,925, Kuzmin.
U.S. Appl. No. 14/848,273, Kuzmin, on appeal.
U.S. Appl. No. 14/880,529, Lercari, U.S. Pat. No. 9,542,118.
U.S. Appl. No. 15/053,372, Lercari, U.S. Pat. No. 9,588,904.
U.S. Appl. No. 15/074,778, Lercari, U.S. Pat. No. 9,785,572.
U.S. Appl. No. 15/690,006, Lercari, allowed.
U.S. Appl. No. 15/211,927, Jadon, U.S. Pat. No. 10,552,058.
U.S. Appl. No. 16/591,735, Jadon.
U.S. Appl. No. 15/211,939, Chen, U.S. Pat. No. 10,552,085.
U.S. Appl. No. 16/702,736, Chen.
U.S. Appl. No. 16/707,934, Lercari.

(56) References Cited

OTHER PUBLICATIONS

NVM Express, Version 1.0b, Jul. 12, 2011, pp. 1-126, published at http://www.nvmexpress.org/resources/ by the NVM Express Work Group.

John D. Strunk, "Hybrid Aggregates: Combining SSDs and HDDs in a single storage pool," Dec. 15, 2012, ACM SIGOPS Operating Systems Review archive, vol. 46 Issue 3, Dec. 2012, pp. 50-56.

Yiying Zhang, Leo Prasath Arulraj, Andrea C. Arpaci-Dusseau, Remzi H. Arpaci-Dusseau, Computer Sciences Department, University of Wisconsin-Madison, "De-indirection for Flash-based SSDs with NamelessWrites," published at https://www.usenix.org/conference/fast12/de-indirection-flash-based-ssds-nameless-writes, Feb. 7, 2012, pp. 1-16.

Andrea C. Arpaci-Dusseau, Remzi Fl Arpaci-Dusseau, and Vijayan Prabhakaran, "ResearchRemoving the Costs of Indirection in Flash-based SSDs with NamelessWrites," Jun. 22, 2010, pp. 1-5, published at www.cs.wisc.edu/wind/Publications/hotstorage10-nameless. pdf by Computer Sciences Department, University of Wisconsin-Madison and Microsoft Research.

Stan Park and Kai Shen, Department of Computer Science, University of Rochester, "FIOS: A Fair, Efficient Flash I/O Scheduler," Feb. 23, 2012, pp. 1-15, published at www.usenix.org/event/fast12/tech/full_papers/Park.pdf by the Advanced Computing Systems Association, Fast12, 10th Usenix Conference on File and Storage Technologies, San Jose.

Eric Seppanen, Matthew T. O'Keefe, David J. Lilja, Department of Electrical and Computer Engineering, University of Minnesota, "High Performance Solid State Storage Under Linux," Apr. 10, 2010, MSST '10 Proceedings of the 2010 IEEE 26th Symposium on Mass Storage Systems and Technologies (Msst), pp. 1-12.

Xiangyong Ouyangyz, David Nellansy, Robert Wipfely, David Flynny, Dhabaleswar K. Pandaz, "Beyond Block I/O: Rethinking Traditional Storage Primitives," Aug. 20, 2011, published at http://www.sciweavers.org/read/beyond-block-i-o-rethinking-traditional-storage-primitives-327868, by Fusion IO and the Ohio State University.

Intel Corp, PCI-SIG SR-IOV Primer—An Introduction to SR-IOV Technology,: 321211-002, Revision 2.5, Jan. 2011, 28 pages.

Open NAND Flash Interface (ONFI), specification, version 2.0, 174 pages, Feb. 27, 2008.

Open NAND Flash Interface (ONFI), specification, version 3.1, 296 pages Sep. 19, 2012.

NVM Express, V. 1.2.1, 217 pages, Jun. 3, 2016.

Garth Gibson, Greg Ganger, "Principles of Operation for Shingled Disk Devices," Canregie Mellon Parallel Data Laboratory, CMU-PDL-11-107, Apr. 2011, 9 pages.

Li-Pin Chang, "Hybrid Solid State Disks: Combining Heterogeneous NAND Flash in Large SSDs," National Chiao-Tung University, Taiwan, ASPDAC 2008, 26 pages.

Hua Wangx, Ping Huangxz, Shuang Hex, Ke Zhoux, Chunhua Lix, and Xubin He, "A Novel I/O Scheduler for SSD with Improved Performance and Lifetime," Mass Storage Systems and Technologies (MSST), 2013 IEEE 29th Symposium on, May 6-10, 2013, 5 pages.

Altera Corp. et al., "Hybrid Memory Cube" specification, 2012, 122 pages.

JEDEC Standard, JESD229, Wide IO, Dec. 2011, 74 pages.

Li-Pin Chang, "Hybrid Solid State Disks: Combining Heterogeneous NAND Flash in Large SSDs," National Chiao-Tung University, Taiwan, 978-1-4244-1922-7/08, 2008 IEEE, 6 pages.

Optimizing NAND Flash Performance, Flash Memory Summit, Santa Clara, CA USA Aug. 2008, Ryan Fisher, pp. 1-23.

High-Speed NAND Flash: Design Considerations to Maximize Performance, Flash Memory Summit, Santa Clara, CA USA Aug. 11, 2009, , Robert Pierce, pp. 1-19.

NAND 201: An Update on the Continued Evolution of NAND Flash, Jim Cooke, Micron White Paper, Sep. 6, 2011, pp. 1-10.

Spansion SLC NAND Flash Memory for Embedded, data sheet, S34ML01G1, S34ML02G1, S34ML04G1, Sep. 6, 2012, pp. 1-73.

Wang et al., "An Efficient Design and Implementation of LSM-Tree based Key-Value Store on Open Channel SSD,"EuroSys '14 Proceedings of the Ninth European Conference on Computer Systems, Article No. 16, Feb. 14, 2014, 14 pages.

Ouyang et al., "SDF: Software-defined flash for web-scale internet storage systems," Computer Architecture News—ASPLOS '14, vol. 42 Issue 1, Mar. 2014, 14 pages.

Macko et al., "Tracking Back References in a Write-Anywhere File System,"FAST'10 Proceedings of the 8th USENIX conference on File and storage technologies, 14 pages, Feb. 23, 2010.

Ohad, Rodeh, "IBM Research Report Defragmentation Mechanisms for Copy-on-Write File-systems," IBM white paper, Apr. 26, 2010, 10 pages, available at domino.watson.ibm.com/library/CyberDig.nsf/papers/298A0EF3C2CDB17B852577070056B41F/$File/rj10465.pdf.

* cited by examiner

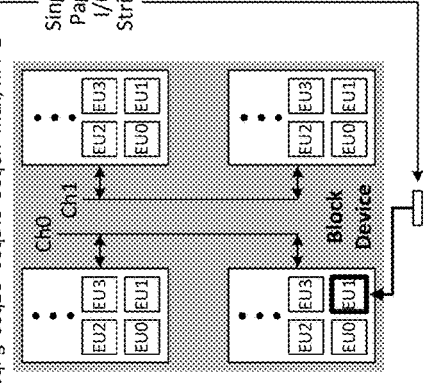
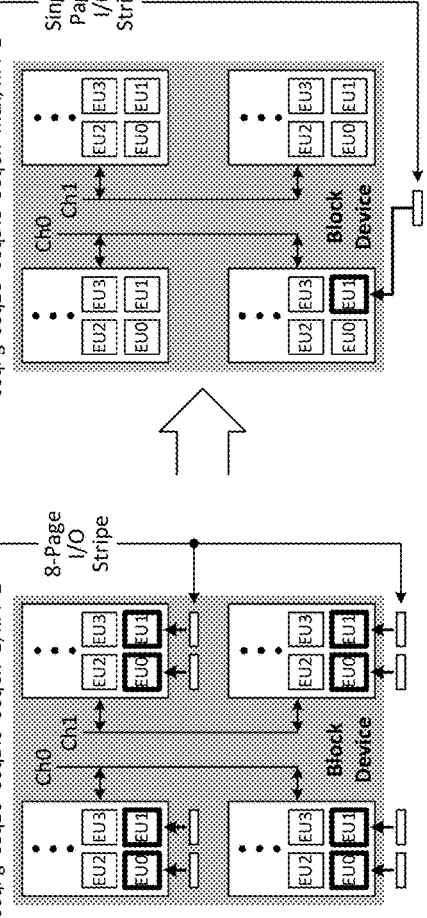
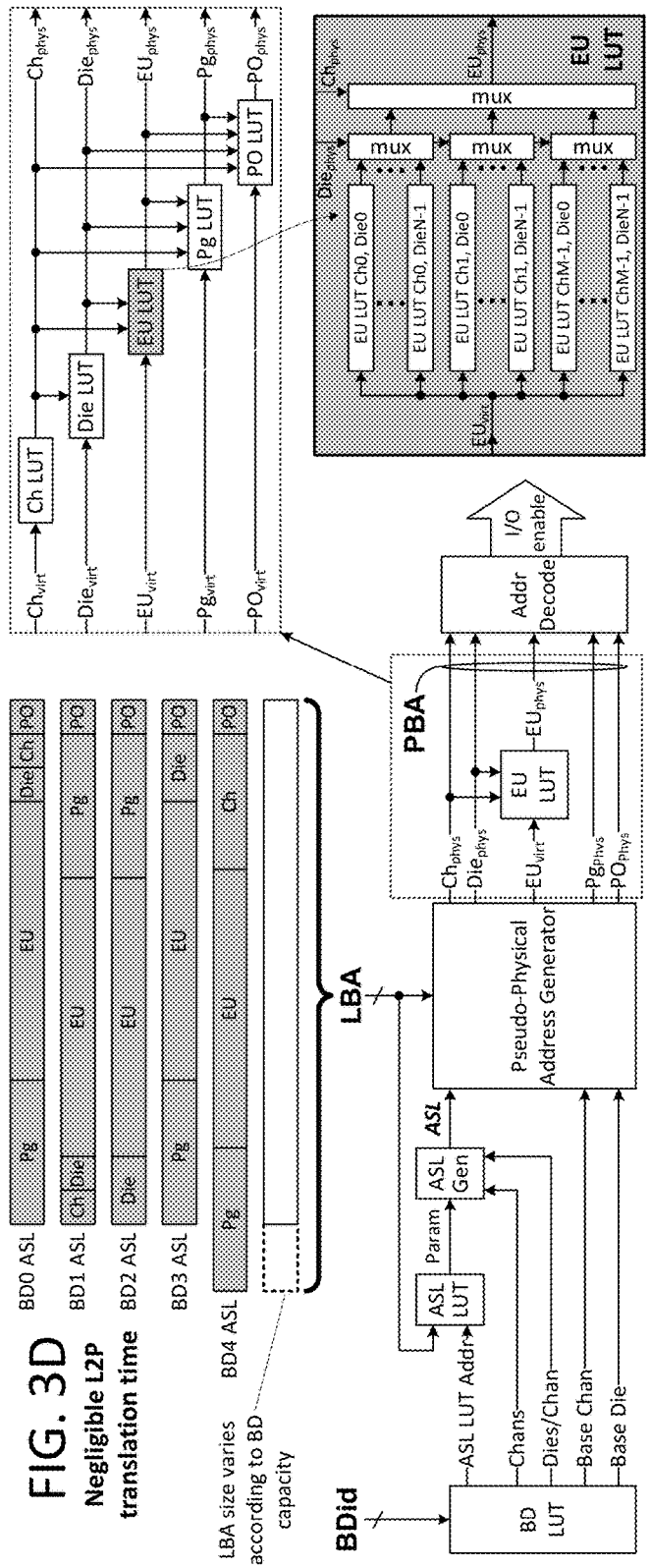
FIG. 3C
Configurable and predictable I/O latency
FIG. 3D
Negligible L2P translation time Host-scheduled Flash maintenance of controller identified segments FIG. 5A
| | ASL LUT | | | | | | | | | | |
|---|---|---|---|---|---|---|---|---|---|---|---|
| | ASL Parameters | | | | | feature control | | | | EC/ecc | |
| LBA Range | seqCh | seqDie | seqEU | seqPg | sLB | rdC | wrC | nPa | nPI | ecc | alg | dest |
| 0-nLB$_{BD}$ | 1 | 1 | 1 | 1 | 4KB | off | off | 1 | 2 | 0 | x | y |
FIG. 5B
Address Sequencing:
seqPg=seqEU=seqDie=SeqCh=1; nPI=1
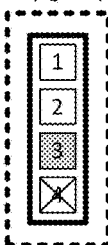
▢ Reserved EU/die (e.g., for ECC)
☐ Host visible EU/die
☒ Reserved, spare EU/die
FIG. 5C
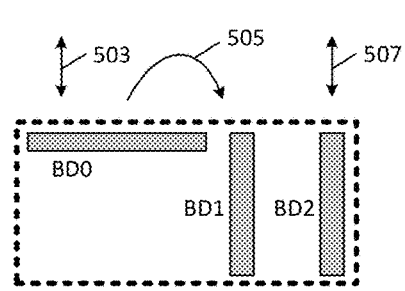
FIG. 5D
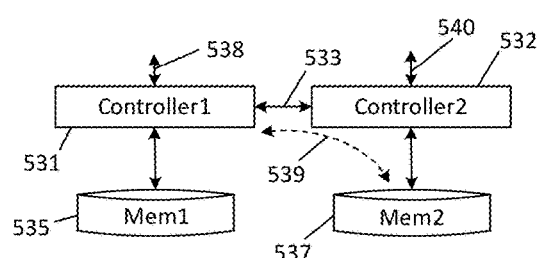
FIG. 5E
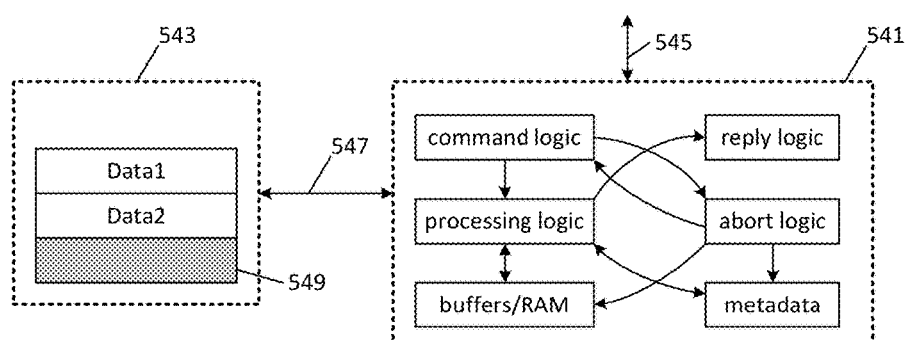

TECHNIQUES FOR SUPPORTING ERASURE CODING WITH FLASH MEMORY CONTROLLER

PRIORITY/INCORPORATION BY REFERENCE

This document is a continuation of U.S. Utility patent application Ser. No. 15/211,927, filed on Jul. 15, 2016 for "TECHNIQUES FOR DELEGATING DATA PROCESSING TO A COOPERATIVE MEMORY CONTROLLER," which in turn claims priority to U.S. Provisional Patent Application No. 62/199,970, filed on Jul. 31, 2015 on behalf of first-named inventor Mike Jadon for "Data Protection And Reduction In A Cooperative Memory Controller," to U.S. Provisional Patent Application No. 62/199,969, filed on Jul. 31, 2015 on behalf of first-named inventor Robert Lercari for "Expositive Flash Memory Control," to U.S. Provisional Patent Application No. 62/194,172, filed on Jul. 17, 2015 on behalf of first-named inventor Robert Lercari for "Techniques for Memory Controller Configuration," and to U.S. Provisional Patent Application No. 62/241,429, filed on behalf of first-named inventor Andrey V. Kuzmin on Oct. 14, 2015 for "Techniques for Directed Data Migration." This document incorporates by reference each of the aforementioned patent applications, as well as U.S. Utility application Ser. No. 15/074,778 (U.S. Pat. No. 9,785,572), filed on Mar. 18, 2016 on behalf of first-named inventor Robert Lercari for "Expositive Flash Memory Control," and U.S. Pat. No. 9,400,749, issued on Jul. 26, 2016 (U.S. Utility application Ser. No. 15/009,275).

FIELD

This disclosure relates to non-volatile data storage and retrieval within semiconductor memory.

BACKGROUND

Nonvolatile memory is a type of digital memory that can retain data in the absence of power. Generally speaking, nonvolatile memory is relatively cheap, but it is also relatively slow when compared to other types of memory, such as random access memory ("RAM"). Given this disadvantage in performance, the memory industry continually strives to improve performance characteristics of nonvolatile memory, so as to enable its use as a cheaper replacement for RAM.

Some nonvolatile memory types are slower than others, and require greater management overhead than others. This management overhead contributes to the slower performance. For example, some types of nonvolatile memory are characterized by a program/erase ("P/E") asymmetry, e.g., memory types such as flash memory and shingled magnetic recording drives have units of minimal write size ("physical pages") and units of minimal erase size ("erase units" or "EU"), with an EU consisting of multiple physical pages. If it is desired to update data stored in a physical page, the old data usually cannot be overwritten and instead, a memory controller typically identifies a new destination location to receive the overwritten data and updates state for the old physical location as being "released;" a given EU can then be erased (i.e., reset to a writeable state) once all of its constituent pages have been released. In part because it cannot overwrite data, the memory controller also typically maintains complex address translation tables which are used to map a logical address used by a host to the true physical location where data is stored. Memory types characterized by P/E asymmetry often require extensive maintenance operations including garbage collection and dedicated erase processes (which return previously-written memory to a writeable state). As a second example, some types of nonvolatile memory are also characterized by the need for program-verify cycles, that is, where the memory device attempts to correctly program a physical page's worth of data (e.g., 4k bytes) and then attempts to verify proper programming using a comparison operation with write data still held in a buffer; in the event of error, the memory device again attempts to again program those individual memory cells which did not correctly program in the previous programming operation. Sometimes, a number of such program-verify operations can be required, with this number generally increasing as a memory's life progresses. This long and variable programming time can make write operations unpredictable, making it difficult for a memory controller to pipeline memory commands, i.e., typically a new operation cannot be sent to a memory array by a memory controller until it is known that a previous write operation in that memory array has actually completed which, typically, is ascertained by polling the memory device and confirming completion or otherwise looking for the memory's assertion of a programming completion signal. Flash memory is a good example of memory which requires these various operations. The required use of these operations contributes to the slow performance of nonvolatile memory because, for example, the need for controller-based address translation can slow memory operations and because maintenance operations can result in a memory array being in-use in a manner that "collides" with a host need to access data in that memory array; further still, a host typically has little visibility into the true physical configuration of memory managed by a given memory controller, and so typically cannot efficiently schedule operations for parallel operation.

Techniques are needed for improving the performance of nonvolatile memory, including memory characterized by one or more of the characteristics referenced above; as noted, such improvement would increase the ability to use such nonvolatile memory as a substitute for RAM. Further, techniques are needed for improving the ability of a host to gain insight into the memory configuration and so efficiently schedule commands sent to a memory controller for that memory. The present invention addresses these needs and provides further, related advantages.

BRIEF DESCRIPTION OF THE DRAWINGS

FIG. 3C illustrates an exemplary pair of block device configurations.

FIG. 3D illustrates an exemplary generation of a physical block address in response to an incoming logical block address, or "LBA."

FIG. 5A shows an address space layout ("ASL") lookup table ("LUT") with configurable per-virtual drive parameters for Erasure Coding and/or error correction.

FIG. 5B shows some memory having host-visible units, such as erase units, dies or other physical or virtual hierarchical units, and reserved units used to store redundancy information.

FIG. 5C is an illustrative embodiment showing how a memory controller can be configured to map redundancy data (or compressed or relocated data) to a block device (BD1) in a manner that does not compete with host data access bandwidth or otherwise present significant constraints relative to concurrent data access or maintenance in another block device (BD2).

FIG. 5D shows transfer or relocation of data (or other information) held by a memory controller for one drive (531) to memory (537) managed by another memory controller (532).

FIG. 5E is an illustrative diagram showing efficient storage system management in association with delegation of compression/decompression, deduplication, or other processing functions to a cooperative memory controller.

Figure 1A:
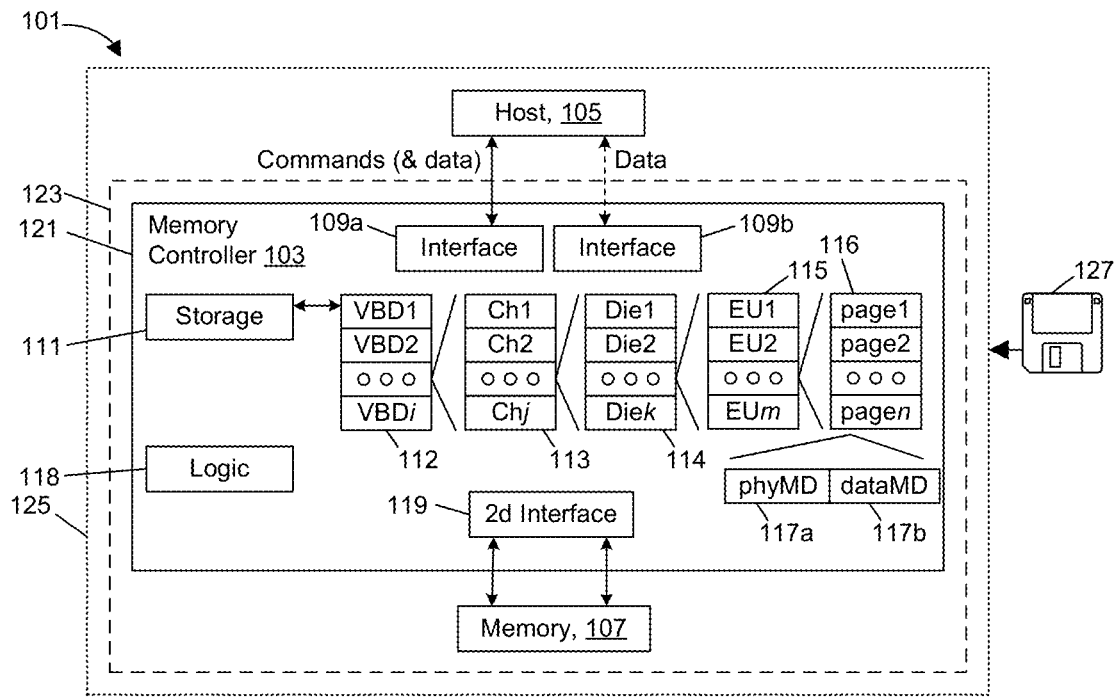
FIG. 1A is an illustrative diagram of a system having a memory controller 103, a host 105 and a memory 107.

The subject matter defined by the enumerated claims may be better understood by referring to the following detailed description, which should be read in conjunction with the accompanying drawings. This description of one or more particular embodiments, set out below to enable one to build and use various implementations of the technology set forth by the claims, is not intended to limit the enumerated claims, but to exemplify their application to certain methods and devices. The description set forth below exemplifies techniques that can be practiced in one embodiment by a host, in another embodiment by a memory controller (e.g., within a single drive or across multiple drives), in another embodiment by a flash memory device (e.g., die or integrated circuit) and in yet another embodiment by a host or memory controller cooperating with one or more other circuits. This disclosure also provides improved designs for a memory controller, host, memory devices, a memory system, a subsystem (such as a drive, e.g., a solid state drive or "SSD"), and associated circuitry, firmware, software and/or other processing logic. The disclosed techniques can also be implemented as instructions for fabricating an integrated circuit (e.g., as a circuit design file or as a field programmable gate array or "FPGA" configuration). While the specific examples are presented, particularly in the context of flash memory, the principles described herein may also be applied to other methods, devices and systems as well.

DETAILED DESCRIPTION

This disclosure provides techniques for exposing memory geometry to a host and for improving the efficiency of host processes in interacting with that memory. In one example, some amount of processing is offloaded by the host to a memory controller, where the offloaded process affects storage space required to store data. For example, the host can offload one or more tasks associated with Erasure Coding, Compression and/or Deduplication (each defined below) to a memory controller, and potentially other tasks as well. Full completion of the processes however is not fully delegated to the memory controller, which awaits an explicit host command to commit the data to memory; because the host is in charge of scheduling this command, the host can schedule it in a manner that does not collide with in-progress or upcoming data access requests.

In one embodiment, the memory controller is a cooperative memory controller defined on a memory controller integrated circuit (meaning an integrated circuit or die where the circuits on the integrated circuit or die are primarily charged with controlling memory outside of the integrated circuit or die, via control signals transmitted from the integrated circuit or die to one or more external memory devices via one or more signal lines). Such a memory controller integrated circuit ("IC") is described for example, in U.S. Pat. No. 9,400,749, which has already been incorporated by reference. The memory managed by that memory controller has structural elements that define a hierarchy of physical elements and possibly virtual elements as well; for example, the memory can (in the case of flash memory) comprise physical pages, EUs, arrays and/or planes, banks, dies and/or channels, all of which are physical elements, and optionally, multiple virtual block devices (i.e., arbitrary/programmable definitions of sets of the dies or other structural elements) with each virtual block device treated as an independent unit for purposes of memory performance constraints (e.g., maintenance and memory device array timing constraints, for example, as described in U.S. Utility application Ser. No. 15/074,778, which has already been incorporated by reference). As one non-limiting example, the memory controller can receive programming from the host so as to define (a) the virtual block devices within memory managed by that controller and/or (b) predefined instructions on how and where it is to store redundancy information as part of an Erasure Coding or ECC operation (e.g., in a specific virtual block device). With an understanding of virtual and physical space allocation beneath a memory controller, the host can direct memory access commands (and/or maintenance commands) to the memory controller in a manner such that these can be efficiently interleaved for concurrent processing, e.g., an operation in one virtual block device ("VBD") can be performed concurrently with operations in other VBDs with greatly reduced likelihood of collision. For example, while a host might conventionally face unpredictable performance from a flash memory controller called upon to perform a write operation and other operations in memory managed by that controller, in one embodiment, the host is provided with information that affords an understanding of memory devices configured below the memory controller, such that a host could schedule concurrent issuance of two write operations for respective virtual devices (e.g., sets of memory devices). In a variation, as also described in U.S. Utility application Ser. No. 15/074,778, the host can program the memory controller to process successive writes within a given virtual block device by directing those successive writes to successive structural elements at any desired hierarchical level; thus, for example, the memory controller can be programmed to direct successive writes to successive physical pages in a given EU, or to respective pages in respective EUs, or to respective dies in a channel, or to respective channels, and so forth. Note that these techniques are optionally combined with the delayed write techniques introduced in the previous paragraph.

According to techniques provided by this disclosure, redundancy information (e.g., ECC data, a RAID slice, etc.) can also be stored in a deterministic manner as suitable for desired performance in the particular embodiment, e.g., with data and redundancy information stored in respective structural elements at a given level of the memory hierarchy, such that the data can be retrieved notwithstanding unavailability of one of these structural elements (e.g., notwithstanding an ongoing data access or maintenance operation in one of these structural elements).

In another embodiment, other processing (such as Compression and/or Deduplication) can be offloaded to a memory controller. As before, the memory controller in one embodiment is a cooperative memory controller defined on a memory controller integrated circuit. Such a memory controller is described for example, in U.S. Pat. No. 9,400,749, which has already been incorporated by reference. The memory controller maintains state information for various structural elements of the memory managed by that controller at a level of the memory hierarchy (e.g., for each physical page, EU, die, channel and/or virtual block device); in addition, the memory controller optionally maintains metadata regarding the data stored in each location. As it performs host-offloaded tasks (e.g., Erasure Coding, Compression, Deduplication), the memory controller transmits state information and/or metadata to the host. For example, the memory controller can transmit to the host information regarding the logical and/or physical address where redundancy information is stored, or information regarding data size (e.g., a specific LBA length or range) needed to store post compression data (or conversely, which is no longer needed given compression efficiency), or regarding memory locations or LBAs which are now free (e.g., because they represent duplicated data, e.g., the host can reassign references to the LBAs to instead refer to existing duplicates in memory), or which are now free for the host to use for other purposes (e.g., space saved by Deduplication or Compression). The host is thereby adapted to update its various reference files or tables so as to only access the information in question; for example, in the case of Compression, a host needs to access only those specific physical locations which contain the compressed data; for example, in the case of Deduplication, a host need only access a single logical location (or set of logical locations) where the reduced set of instances of the data is stored. In an embodiment that uses circuit based address translation across multiple levels of the hierarchy (e.g., as described in in U.S. Utility application Ser. No. 15/074,778), the host can update its stored reference information so as to directly access data in question (e.g., redundancy information, duplicated data, compressed data, and so forth). Other variations will also no doubt occur to those having skill in the art, which nonetheless employ the various basic techniques described herein.

Prior to proceeding to a further detailed description regarding various embodiments, it would be helpful to introduce certain terms that will be used in this disclosure.

Specifically contemplated implementations can feature instructions stored on non-transitory machine-readable media. Such instructional logic can be written or designed in a manner that has certain structure (architectural features) such that, when the instructions are ultimately executed, they cause the one or more general purpose machines (e.g., a processor, computer or other machine) to behave as a special purpose machine, having structure that necessarily performs described tasks on input operands in dependence on the instructions to take specific actions or otherwise produce specific outputs. "Non-transitory" machine-readable or processor-accessible "media" or "storage" as used herein means any tangible (i.e., physical) storage medium, irrespective of how data on that medium is stored, including without limitation, random access memory, hard disk memory, EEPROM, flash, storage cards, optical memory, a disk-based memory (e.g., a hard drive, DVD or CD), server storage, volatile memory and/or other tangible mechanisms where instructions may subsequently be retrieved and used to control a machine. The media or storage can be in standalone form (e.g., a program disk or solid state device) or embodied as part of a larger mechanism, for example, a laptop computer, portable device, server, network, printer, or other set of one or more devices. The instructions can be implemented in different formats, for example, as metadata that when called is effective to invoke a certain action, as Java code or scripting, as code written in a specific programming language (e.g., as C++ code), as a processor-specific instruction set, or in some other form or language; the instructions can also be executed by a single, common processor or by different processors or processor cores, depending on embodiment. Throughout this disclosure, various processes will be described, any of which can generally be implemented as instructions stored on non-transitory machine-readable media. Depending on product design, such products can be fabricated to be in saleable form, or as a preparatory step that precedes other processing or finishing steps (i.e., that will ultimately create finished products for sale, distribution, exportation or importation). Also depending on implementation, the instructions can be executed by a single computer and, in other cases, can be stored and/or executed on a distributed basis, e.g., using one or more servers, web clients, or application-specific devices. Each function mentioned in reference to the various FIGS. herein can be implemented as part of a combined program or as a standalone module, either stored together on a single media expression (e.g., single floppy disk) or on multiple, separate storage devices. Throughout this disclosure, various processes will be described, any of which can generally be implemented as instructional logic (e.g., as instructions stored on non-transitory machine-readable media), as hardware logic, or as a combination of these things, depending on embodiment or specific design. "Module" as used herein refers to a structure dedicated to a specific function; for example, a "first module" to perform a first specific function and a "second module" to perform a second specific function, when used in the context of instructions (e.g., computer code), refers to mutually-exclusive code sets. When used in the context of mechanical or electromechanical structures (e.g., an "encryption module," it refers to a dedicated set of components which might include hardware and/or software). In all cases, the term "module" is used to refer to a specific structure for performing a function or operation that would be understood by one of ordinary skill in the art to which the subject matter pertains as a conventional structure used in the specific art (e.g., a software module or hardware module), and not as a generic placeholder or "means" for "any structure whatsoever" (e.g., "a team of oxen") for performing a recited function. "Erasure Coding" as used herein refers to any process where redundancy information is stored, such that the data can be recovered if a memory device or unit of memory is off-line or otherwise inaccessible. "Redundancy information" is used to describe additional data used to permit recovery of data where the underlying data is incomplete or reflects error (e.g., it can encompass an erasure code, used to permit recovery of data when a storage device is inaccessible, as well as error code correction or "KC" functions). "RAID" as used herein refers to a redundancy scheme that is tolerant to one or more devices or storage locations being offline or otherwise inaccessible, for example, encompassing a situation where m page-sized segments of data are received and where n physical pages in respective structural elements are used to store data (i.e., where n>m) to permit recovery of the original n segments notwithstanding that at least one of the m respective structural elements is offline; for example, the term RAID as used below is not limited to a disk-based scheme. "Compression" refers to a process where data of a first size is encoded in a manner so that the data can be recovered or nearly recovered from storage of data of a second, smaller size—it includes situations where data can be losslessly recovered as well as situations where there is some loss, such as where data is quantized to enable more efficient storage. "Compression" also should be understood to encompass the functions of decompression, which generally occur using the same structural elements referenced below, but in reverse order as part of a reverse process; for example, a memory controller can be asked to decompress data in association with a data read and thus return a larger quantum of data than natively represented by a logical block address (LBA) range specified by the data read. "Deduplication" refers to a process where attempted storage of identical pages of data at separate memory locations is detected, and where that storage is consolidated into one page or other instance of the data.

Having thus introduced some illustrative capabilities provided by various techniques describe herein, this description will now proceed to discuss a number of illustrative embodiments in additional detail.

FIG. 1A illustrates a first embodiment of a storage system 101 and associated memory controller 103, host 105 and memory 107. In the illustrated embodiment, the memory controller is structured to cooperate with the host 105 in the control of the memory 107. The memory controller 103 has at least one first interface 109a/b to exchange commands and data with the host. Although two such interfaces and corresponding transmission paths are seen in FIG. 1, these interfaces may be combined (e.g., with communications occurring via a packet-based transmission scheme). The commands generally relate to operations in memory such as read and write operations, although commands can also be directed to the memory controller 103 to assist in memory functions. In one embodiment, the commands and signaling protocol are compatible with one or more standards, for example, with Non-Volatile Memory Express (NVMe) or the Small Computer System Interface (SCSI) (in the case of commands) and Peripheral Component Interconnect Express (PCIe) or Serial-Attached SCSI/Serial ATA (SAS/SATA) (in the case of signaling formats). The memory 107 generally has one or more arrays of memory cells and array control circuitry that may support one or more planes, banks, dies, channels or other structural elements depending on design. Each array in turn has one or more subdivisions of memory cells for which subdivision-specific state and/or other information will be tracked by the memory controller 103. The memory controller in such an embodiment tracks state information for each (physical and/or virtual) unit or subdivision of memory in a hierarchy managed by the memory controller, optionally at each level, as well as metadata for data (e.g., hold/cold status, age, read frequency, back references and many other types of information, as will be discussed below). In embodiments where the memory is flash memory and the memory controller a flash memory controller, each subdivision can include virtual block devices ("VBDs"), channels, dies, banks, arrays, planes, erase blocks or units (EUs) or write units (i.e., physical pages of memory cells); each physical page corresponds to a minimum data size (or length) that must be written together, each EU is the minimum block of data that must be erased together (typically consisting of many pages). Note also that, sometimes, data can be structured so as to consist of multiple "segments," e.g., each one of which is a page of data (e.g., one unit of data can consist of multiple page-sized segments of data).

The memory controller tracks subdivision-specific data using internal storage 111. In one embodiment, this storage can be volatile memory such as synchronous random access memory (SRAM); in another embodiment, this storage can be non-volatile memory, for example an internal flash array. As denoted by reference numeral 113, the storage retains information for each subdivision of the memory governed by the memory controller, in this case, for one or more virtual or physical subdivisions of the memory 107. In embodiments where the memory 107 is a NAND flash memory, the storage retains information for each VBD, channel, die, EU, and physical page of the flash memory (e.g., VBDs 1-i, channels 1-j per VBD, dies 1-k per channel, EUs 1-m per die, and pages 1-n per EU, as variously indicated by reference numerals 112-116) for all flash memory managed by that memory controller; these numbers do not have to be homogeneous throughout the flash memory, e.g., one VBD can span 4 channels while another can span 1, and similarly, the number of dies per channel, EUs per die and pages per EU can vary throughout the memory. For example, depending on manufacturer and design, there can be 128-256 pages per EU, with each EU corresponding to a substrate well, and each page corresponding to an independently controlled wordline for memory cells tied to that substrate well. The data tracked for each subdivision can be of two types, as denoted by numerals 117a and 117b, including information regarding the physical state of the (virtual or physical) hierarchical elements of the memory, for example, wear of that memory location, whether constituent elements are erased (rendered writeable) or have been released, the need for various types of maintenance and so forth (117a) and information regarding the data stored in that location, for example, logical address, back references, data age, hot/cold status, and so forth (117b); when data is moved between locations, the metadata (117b) associated with the data is moved to or otherwise associated with a new table location to correspond to the new destination, whereas the metadata (117a) describing state of the memory location itself stays associated with the old memory location, as it describes state of that particular location. Note that in other embodiments, the various metadata (117a/117b) does not move, but is rather stored in two tables with the logical to physical (L2P) mapping of one of those tables being changed. The memory controller also has logic 118 that performs various functions, e.g., it is operable to send to a host either some or all of the "raw" information retained in the storage 111, or derived or processed information based that storage 111. This logic for example can include circuitry within the memory controller adapted to respond to host commands seeking specific metadata; alternatively, this logic can also include circuitry that applies pertinent filters or comparisons and that notifies the host when a tracked metric meets an assigned threshold. This information or an alert representing a particular condition can be transmitted to the host via the at least one first interface 109a/b, via a dedicated connection or via a backplane connection. As will be shown below, the logic 118 can also comprise circuitry and/or instructional logic to assist with offloaded functions from the host, and perform various other functions cooperatively, as will be discussed below. The logic 118 also performs functions such as address translation and write and read (i.e., data access) control and various maintenance operations, and it sends commands to memory via a second interface 119 in order to accomplish these various functions.

Several configurations are also represented by the embodiment of FIG. 1. First, as represented by numeral 121, the memory controller 103 can be designed as a standalone integrated circuit with the host 105 and the memory implemented as one or more discrete integrated circuits (e.g., the host in the form of a host processor). Second, as represented by dashed-line box 123, the memory controller 103 can instead be co-packaged or otherwise combined with the memory 107 as a storage subsystem. For example, dashed-line box 123 can represent a discrete solid-state drive (SSD) where the memory controller is implemented as an IC and where the memory is embodied as one or multiple NAND flash devices. It is also possible (as represented by dotted-line box 125) to combine the memory controller 103, the host 105 and the memory 107 as a single system, for example, a network-attached storage system or a storage system adapted for connection with another digital system (e.g., via a USB, PCIe, SATA, Ethernet or other standard signaling protocol). Finally, as represented by reference numeral 127, cooperative management functions can be embodied as instructions stored on non-transitory machine readable media, for example, for use in controlling a host processor, memory controller or other circuit. That is, software or firmware can be used to control actions of a host, memory controller or other circuits.

Figure 1B:
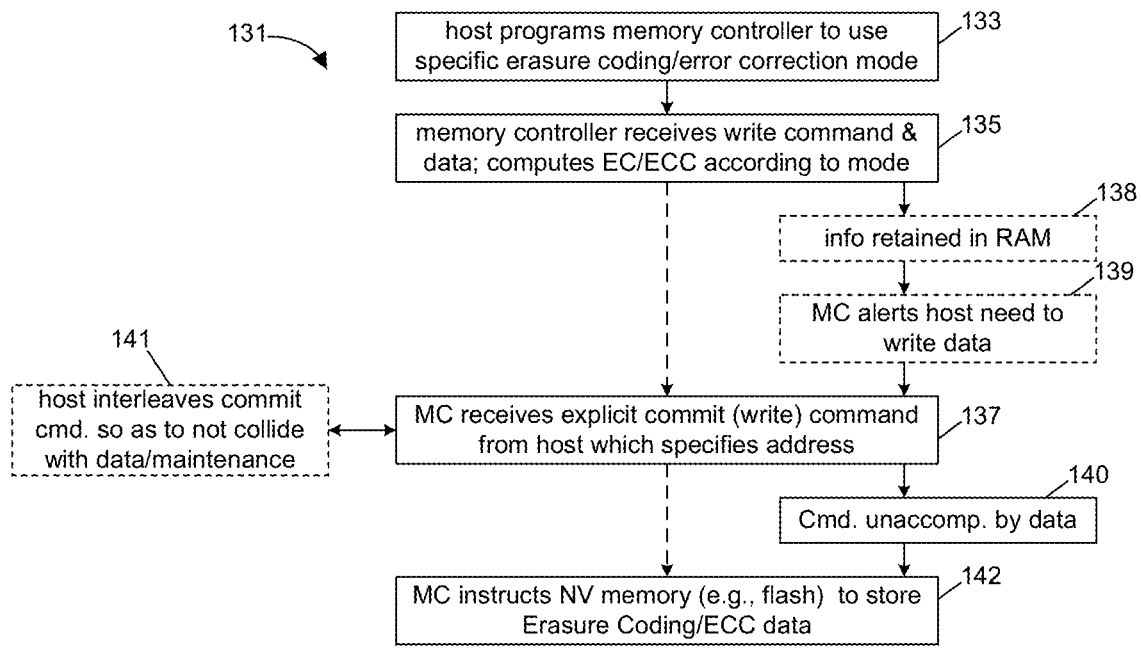
FIG. 1B is a block diagram showing an embodiment in which a memory controller performs Erasure Coding and/or error correction code (ECC) generation functions, in a manner that enhances storage efficiency and minimizes competition with host-required data access bandwidth.
Figure 1C:
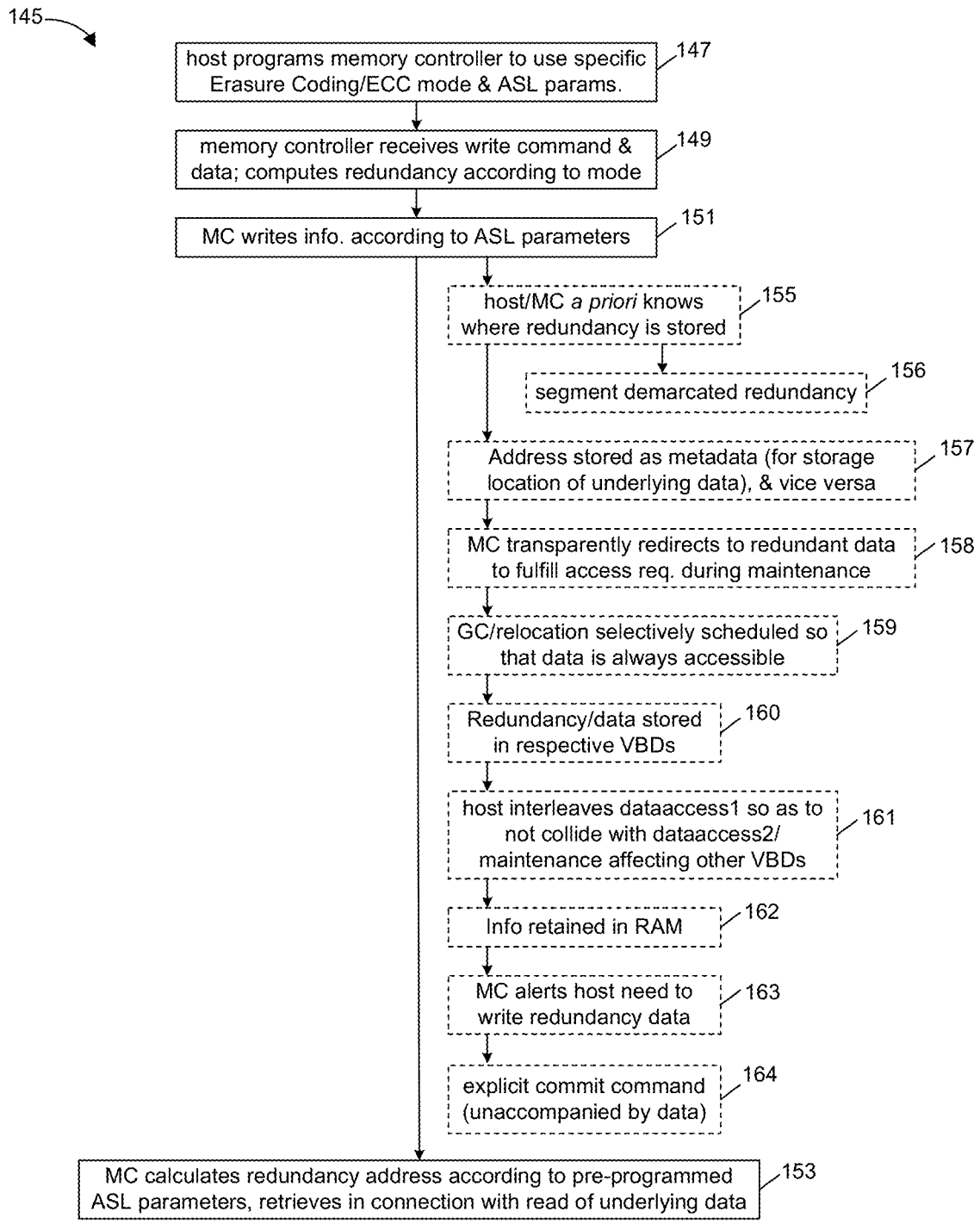
FIG. 1C is a block diagram showing another embodiment in which a memory controller performs Erasure Coding and/or error correction code (ECC) generation functions to generate and manage redundancy data, in a manner that minimizes competition with host-required data access bandwidth.
Figure 1D:
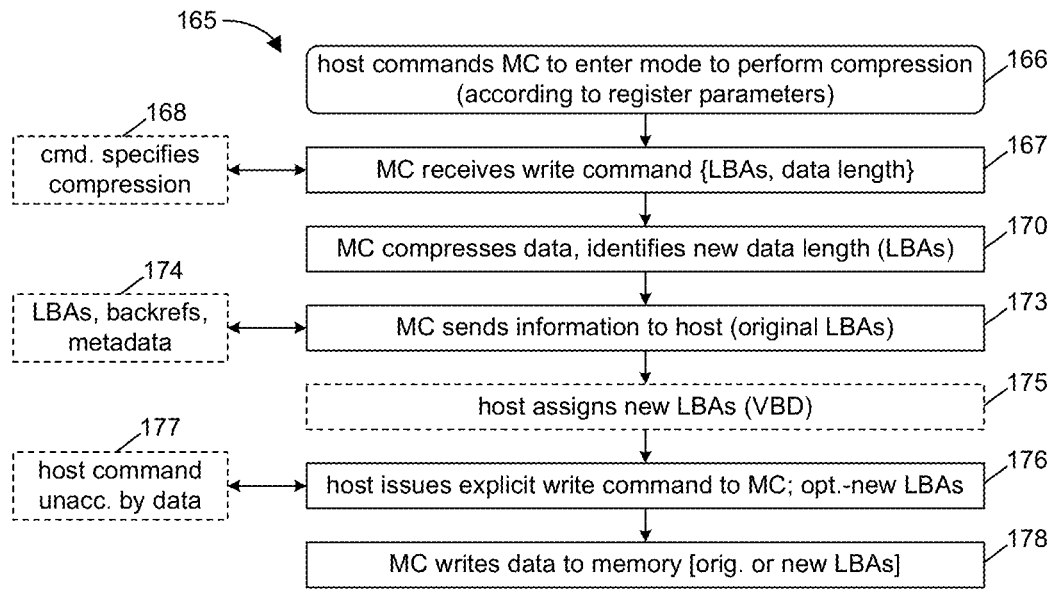
FIG. 1D is a block diagram showing an embodiment in which a memory controller performs compression and decompression functions in a manner that enhances storage efficiency and minimizes competition with host-required access bandwidth.

As noted above, the memory controller advantageously cooperates with the host to perform various offloaded processing functions and also to enhance memory bandwidth and availability. FIGS. 1B-1D show various ways in which this can be performed using a cooperative memory controller, such as the one illustrated in FIG. 1A.

FIG. 1B shows one embodiment 131 for performing Erasure Coding or ECC generation in a way that offloads processing from the host, and yet provides for increased predictability and reduced competition with host data access requests. As noted by block 133, the host can program the memory controller so as to use a specific redundancy mode (e.g., where Erasure Coding can include RAID type functions or other forms of redundancy or error correction). This programming can be performed in a number of ways, for example, by programming a mode register in the memory controller, by using a command field that indicates to the memory controller that Erasure Coding/ECC generation is to be performed for that data, or in some other manner; note also that such programming can vary by destination, i.e., as will be exemplified below, the memory controller can be programmed so as to perform Erasure Coding for VBD 1 but not VBD2, or on the basis of logical address (e.g., logical block address or "LBA," or logical unit number, or "LUN"). Per numeral 135, the memory controller receives a write command (i.e., programming command) for which it is to compute redundancy information; the type of redundancy, whether based in part or other data, or just on the data that is the subject of the write, is computed by the memory controller using circuitry and/or instructional logic (as exemplified by numeral 118 from FIG. 1A, i.e., hardware logic and/or instructional logic can be used).

However, in this embodiment, rather than immediately writing the redundancy information to flash memory, the memory controller holds the redundancy information and waits for a separate command from the host to commit such redundancy information to memory, per numeral 137. The right side of FIG. 1A illustrates various optional ways in which this can be prompted, e.g., per numeral 138, the memory controller can be provided with a small (internal or external) RAM in which the redundancy information is stored (e.g., the RAM can be onboard the memory controller integrated circuit, or can be a standalone storage; in another embodiment, this memory can be outside of the storage drive). There are various circumstances under which this can be quite useful, e.g., for error correction code (ECC) information, where the redundancy information is much smaller than page size, this permits the memory controller to save space by accumulating redundancy information for many writes prior to committing the information to memory, and so enhances bandwidth and minimizes the number of writes to memory. In addition, in systems in which there are multiple VBDs or available alternative locations in which to store data, this permits the host to decide at a later time where redundancy information should be placed; as a non-limiting example, if there are alternate destination choices, one of which has an upcoming write or read request scheduled by the host, the host can choose to put redundancy information in another one of the destination choices, so that both operations can be performed concurrently (i.e., without waiting for verified, time-consuming programming of data in a given array, as is conventional for flash memory). To perform this destination selection, the "commit" command sent by the host can provide the memory controller with a pointer to the data operand (e.g., if the memory controller supports multiple such operands in flight) and a destination address to which the memory controller is to send or write the data in question. Various further options will also occur to those skilled in the art which are contemplated by these techniques, for example, (1) waiting until the RAM used for redundancy information is full, and only then writing the redundancy information to flash memory, (2) using a cache management strategy to write only "evicted" (i.e., old) redundancy information to flash memory, (3) writing the redundancy information to one of several alternative destinations, selected by the host, based on various performance ends, for example, to the most (or least) worn memory. In another optional embodiment, per numeral 139, the memory controller can notify the host by transmitting information to the host to alert the host that it should schedule the writing of redundancy information to memory (e.g., because the RAM is full, or the particular redundancy information is to be evicted from RAM, or based on another trigger); this then prompts the "commit" command from the host, at a time selected and scheduled by the host, per numeral 137. Note that in this embodiment, per numeral 140, the redundancy information is not sent to the host during this process, i.e., the commit command is unaccompanied by data and merely references a RAM location (e.g., provided by the memory controller notification referenced above) from which to retrieve the data and a destination address (e.g., LUN, VBD, etc.) selected by the host to serve as the destination. Per numeral 141, the host can interleave the commit command with other data access or maintenance operations so as to not violate any type of memory device performance constraint; for example, the host can send the commit command in a manner such that the redundancy information is written to a VBD at the same time that a write, read, garbage collection, hot/cold data relocation, wear leveling or other operation is ongoing in other VBDs, dies, or other structural elements in the memory hierarchy. Stated in another manner, the host schedules the commit command at a time, given the intended destination, that is suitable for the host, given various activities queued by the host for the various VBDs and other structural elements in the memory. This command and the hosts actions are optionally dependent on the information sent by the memory controller; as a non-limiting example, in the case of compression, the host can choose a destination for the compressed data based on information informing the host of compression efficiency for the particular data, and potentially also based on other metadata optionally supplied by the memory controller. Responding to the host's commit command, the memory controller then instructs the pertinent nonvolatile memory to carry out programming of the redundancy information, as indicated by numeral 142.

FIG. 1C shows another embodiment 145 that performs Erasure Coding/ECC functions, but this time, with destination location for the redundancy information already programmed into or otherwise "understood" by the memory controller. In this embodiment, the memory controller is a pseudo-expositive memory controller, for example, as described in U.S. Utility application Ser. No. 15/074,778, which has already been incorporated by reference; certain structures of such a memory controller will also be described below. In general, an address space layout (ASL) table used by such a memory controller is expanded, not just to describe virtual block device, but to permit programming of a redundancy algorithm and specification for the destination of the redundancy information for each piece of data written to the particular VBD. As before, any type of redundancy scheme can be used as suitable to the particular system design, with logic on-board the memory controller computing redundancy information in connection with one or more writes of data. As generally described by U.S. Utility application Ser. No. 15/074,778 (and below), each VBD can be defined to include one or more channels, dies per channel, arrays per die, EUs per array, and so forth, with the memory controller being programmable to define whether successive writes (e.g., logical blocks) are written to successive pages, EUs, planes, dies, channels and so forth; a modulo address circuit is then used to receive a logical address (LBA) specified by the host in accordance with a data access operation and to resolve that LBA on a configurable basis to a specific physical hierarchy in the memory, with a remainder then being used to index a particular address translation file or table specific to a resolved level of the memory hierarchy in order to obtain a physical address for data. As a hypothetical example, the host can provide a LBA to the memory controller with the memory controller using hardware logic and configurable parameters to (a) resolve a VBD identifier, (b) a channel address in the particular VBD, (c) a die address on the particular channel, and then to retrieve an address translation table specific to the particular die (i.e., the resolve die address) in order to identify a physical EU and/or page address where data corresponding to the LBA is stored. Note that this example is just that, and the logical block address can be resolved in a variety of ways, depending on configured parameters, i.e., see FIGS. 7-8 and the associated discussion in U.S. Utility application Ser. No. 15/074,778; in a variant, for example, the address translation table can be used to swap structural elements in/out to manage defects or for other purposes (e.g., to swap one reserved die in for another, as generally described in U.S. Utility application Ser. No. 15/074,778. Depending on configured parameters for the redundancy information, the remainder address (or the LBA or LUN number for the data, or the physical address for the data) can be used to identify a location (e.g., in the same or another die, or in any other virtual or physical structure in the memory hierarchy) to store the redundancy information; for example, in an example where the redundancy information is ECC data for data stored at LBA x, and the ASL table information for the destination block device for the data indicates a destination for the redundancy data in die y, the memory controller can access die y, and build address translation information that maps LBA x to address z in die y. In another example, if the redundancy information comprises RAID-6 or RAID-4 redundancy information (i.e., permitting data recovery even when 2/1 storage locations are unavailable), the memory controller can use an identifier linking multiple segments of data, and can similarly deterministically identify a destination dependent on that identifier (e.g., in additional devices or VBDs), dependent on the stored ASL table parameters.

Note that these processes can be performed in reverse; for example, using deterministic addressing, the memory controller can be configured to transparently retrieve redundancy information in connection with a read, e.g., by reading multiple structural elements concurrently, by performing data integrity management functions, and by returning to the host a smaller quantum of data than was retrieved from the memory controller, e.g., a single read address is translated and used to access data (and redundancy data) according to the stored ASL parameters, and a single set of error-free read data is returned by the memory controller in fulfillment of the host command.

FIG. 1C identifies various processes associated with the mentioned redundancy operations. For example, the memory controller receives a write command and associated data, and computes redundancy information according to programmed parameters (and depending on embodiment, VBD identity), per numeral 149. The redundancy information is then immediately or at a later time written in to memory, per numeral 151. Finally, in connection with a later data read, either automatically or upon discovery of error (e.g., device unavailability in the case of a RAID scheme), the memory controller is able to deterministically identify the structural element(s) in the memory hierarchy where the pertinent redundancy information is (are) stored, to retrieve that redundancy information, and to automatically return to the host the requested data, per numeral 153.

Numerals 155-164 illustrate various features and options associated with these processes. First, per numeral 155, in such a scheme, the memory controller knows a priori where redundancy information is stored, because each logical block address (dependent on ASL table parameters) is used to deterministically identify a storage address for redundancy information. As implied by numeral 155, if desired, the memory controller can also transmit the address for redundancy information to the host; that is, in one embodiment, instead of having the memory controller manage unavailability of data segments (e.g., during a read), the host can handle this function. Per numeral 156, in one embodiment, a VBD is configured according to programmed ASL table parameters to store error information as an additional segment. For example, relative to FIG. 3A below, an example will be given of a virtual block device "BD4," defined so as to be one die deep by sixteen channels wide; in such an embodiment, the first twelve channels could be used to store respective data segments, with the last four channels being used to store redundancy information. Note that the segments used to store redundancy information do not have to be host-visible, i.e., in one embodiment, reserved structural elements are used to store ECC data or other redundancy information in a manner transparent to the host. Many variations of these examples will occur to those having skill in the art. Per numeral 157, in one embodiment, a cooperative memory controller can optionally store the address for redundancy information (e.g., ECC data) as a metadata entry for each structural element in the memory hierarchy where the underlying data is stored; for example, if a particular page of data is stored in page #1, EU #23 in die #1, a metadata entry for that location can store (a) state information for that physical location, and (b) metadata for the data stored at that location, including where corresponding redundancy information can be found. Per numeral 158, in another variant, the memory controller can be configured to transparently manage redundancy information, for example, storing redundancy information in a reserved structural element in a manner not visible to the host using the deterministic addressing schemes described above. Per numeral 159, in yet another embodiment, the memory controller performs scheduling of maintenance functions such as garbage collection and wear leveling operations in a manner so that data is always accessible, e.g., by not scheduling such an operation in a particular structural element unless there are no reads or writes imminently (or maintenance operations) in progress or queued for that structural element. Per numeral 160, the host can configure the memory controller to store data segments and redundancy information in respective VBDs (or other respective structural elements, e.g., dies), as desired for the particular embodiment. Operations can be planned for concurrent execution in a manner interleaved amongst structural elements so that structural elements associated with an upcoming data access operation are always accessible (161) and, conversely, such that the planned other operation does not collide with an in-progress or upcoming data access operation. The embodiment of FIG. 1C can optionally be combined with other techniques discussed herein, e.g., retaining redundancy information in RAM (162), sending the host an alert regarding the need to commit redundancy information to memory (163) and receiving an explicit "commit" command to commit previously computed redundancy information to memory (164). Many variants of the processes which are contemplated by the techniques of this disclosure will be apparent to those having skill in the art.

FIG. 1D is a block diagram of an embodiment 165 where compression/decompression functions are offloaded to a cooperative memory controller. As indicated by numeral 166, the host commands the memory controller to perform compression by programming the memory controller with suitable parameters or placing the memory controller in a mode where it automatically compresses received write data according to desired parameters (e.g., a desired compression scheme); the memory controller receives a write command (e.g., specifying one or more LUNs, per numeral 167) and data having an associated data length, and it then tries to compress that data to occupy a shorter data length. In a variation, the command itself can be a specific type of compression (or have a field) used to command selective compression by the memory controller (168). Note that, in many applications (and depending on the compression scheme), the achievable compression will be variable; the memory controller therefore advantageously identifies a new data length as the result of compression (170), e.g., it identifies a number of LBAs (e.g., pages) that will need to be used for the compressed data (or conversely, the number of pages/LBAs freed from the original write request, i.e., because they are no longer needed). The memory controller transmits this information to the host (per numeral 173), for example, transmitting LBAs, back references and other metadata sufficient for the host to update its file references so as to know the required quantum of data that must be retrieved in order to read the data (174). Optionally, per numeral 175, it is also possible for the memory controller to hold the compressed data (instead of immediately writing it), with the host identifying a new LBA (or set of LBAs) in which to store the data; for example, if compression was so effective that a different virtual block device (or different drive or other memory location) could be more efficiently employed to store the data, as recognized by the host based on compression effectiveness data returned by the memory controller, the host can (as part of a commit command, 176) assign a different virtual block device (or indeed, assign any other LBA) in a manner so as to efficiently store the compressed data. As before, optionally, the commit command can be unaccompanied by data (177) and instead simply reference a particular source data location (or other identifier for the compressed data) with instructions for the memory controller to write the compressed data to memory. Per numeral 178, the memory controller then writes the compressed data into memory (e.g., flash), with the result that unused LBAs that were associated with or implicated by the original request are understood by both of the host and the memory controller to be free.

For example, in connection with a compression operation, an exemplary operation features the host sending a write command to the memory controller to write "data1" at LBA range [1 . . . x]. Responsive to this, the memory controller compresses the write data such that it now has a smaller data length, i.e., that will occupy a smaller range than the LBA range [1 . . . x]. The memory controller informs the host of this fact, optionally writes "data1" to LBA range [1 . . . y], where y<x (optionally also, in a variant of this design, the memory controller can await receipt of an explicit "commit" command from the host before writing data to memory). However, irrespective of whether this option is used, the host is informed that the original LBA range (e.g., memory space previously associated with "data1" is now partly free, i.e., it can reassign LBA range [y . . . x] to another set of data (e.g., "data2") and can update its file references to "data1"

to point only to LBA range [1 . . . y]. Finally, at some point, the host sends one or more write commands to the memory controller for "data2" (and possibly other data), where the LBA range(s) for these commands encompass LBAs in the range of [y . . . x].

Various mechanisms exist in the host logic to allocate, clean and reclaim storage space, group particular blocks of data, schedule input/output ("I/O") accesses, determine write segment lengths and destinations, and cache data. Specifically, this host logic can include a space allocator, segment cleaner, scheduler, write director, or data cache. These mechanisms are based upon policies that can include variables and/or algorithms, including smart learning algorithms. As an example, a variable in such a policy could be the results of data compression of particular blocks of data, the expected access frequency of particular blocks of data, or the life of particular blocks of data. Per numeral 173 in FIG. 1D, the memory controller transmits information, for example compression efficiency ratios, freed (or used) LBAs, state, and other metadata to the host logic as the requisite variable for a policy found in this host logic. Adaptive algorithms in this host logic can then dynamically adjust the policy based upon the input variable received from the memory controller. As an example, the memory controller could transmit the compression results, access frequency, fragmentation, age for a particular range of data, or any combination thereof to the respective host logic (either in bulk or on an incremental basis for each write command). Based upon this information, the host logic can dynamically adjust respective policies related to space allocation, cleaning, reclamation, scheduling, write segment sizes, write destinations, grouping or relocation of blocks of data, caching of data, or any combination thereof, to increase performance and efficient use of the storage device. As an example, if the host detects a specific pattern of compression (e.g., a high degree of compression for a group of data, for example, as determined from similar metadata), the host could change the block device used to store the data, or it could change ASL table programming in order to enhance storage efficiency (e.g., by storing successive data in respective dies, or conversely, in a single die (and/or EU)). Clearly, many variations of these principles will readily occur to those having skill in the art without departing from the techniques provided by this disclosure.

Figure 1E:
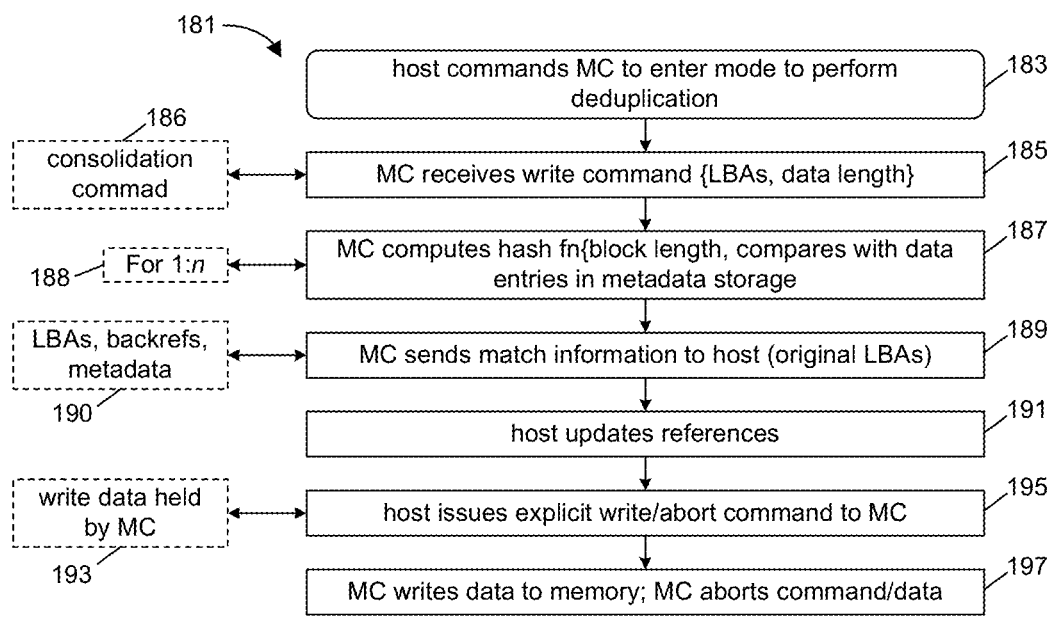
FIG. 1E is a block diagram showing an embodiment in which a memory controller performs deduplication functions in a manner that enhances storage efficiency and minimizes competition with host-required access bandwidth.

FIG. 1E shows various processes associated with Deduplication performed by a cooperative memory controller; these processes are generally designated using numeral 181. As with previous examples, the host can optionally instruct (183) the memory controller to enter a deduplication mode, in which the memory controller processes new write data (or passively examines memory contents) to identify duplicate data blocks. As part of this process, the host can configure the memory controller to use any desired algorithm or process. Note that a number of deduplication algorithms are conventionally known and that it is within the ordinary level of skill generally to implement a particular deduplication algorithm. Generally speaking, in connection with a new write command (185), a page of data (e.g., 4,096 bytes) is hashed (187) and is compared to similar hashes for other pages stored in memory for a particular logical address (e.g., LBA) range, i.e., as retained metadata for a given structural element in the memory hierarchy; as noted previously, such metadata (i.e., of this type, e.g., hashes of storage pages) is in this embodiment advantageously retained for all data in the pertinent memory (e.g., for all entries in the pertinent VBD or drive, in association with the structural element storing such data). The LBA range that is searched can optionally be restricted to a subset of memory, e.g., associated with a specific file for example. The data length represented by each hash is generally of sufficient length (e.g., 4,096 bytes), such that it is statistically guaranteed that any existing data having the same hash is a duplicate of the new data. Alternatively, if deduplication is performed essentially as a garbage collection process (i.e., as part of periodic maintenance), the deduplication effort can be initiated by a consolidation command 186 and performed for n existing data entries in a specified LBA range (188). Upon identifying any matches, the host sends match information back to the host (189), which the host uses to update its various file references (191). For example, if the memory controller determines that a new write presents data for LBA x that is identical to existing data at LBA y, the host can send identifiers (e.g., back references) for the new write back to the host, which the host then uses to update its various LBA x file references to instead point to LBA y; as will be exemplified below relative to FIG. 5F, the back references returned to the host can span multiple levels of indirection, and can therefore be used so that any future references for LBA y will instead be corrected to refer to LBA x. In such an example, the memory controller holds the new write data (193) pending a commit command from the host (195), or alternatively, an abort command (i.e., which causes the memory controller to abandon the new write, ostensibly because the host has updated its file references and no longer requires the new data). Following this processing, the memory controller either writes the new data to memory or aborts the command as instructed (197). If existing data is to be discarded (e.g., in favor of other stored data), the memory controller can mark state information for the corresponding structural element in the memory hierarchy as "released" (i.e., similarly informing the host so as to update back references, and so as to potentially consolidate metadata for the various duplicate entries). Note that any permutation of these processes is possible to provide for equivalent operation. For example, the memory controller can be configured to delay a write command but allow it to automatically proceed with a write unless an abort command has been received from a host within a predetermined time interval; conversely, a memory controller can be configured to abort a command to write data that duplicates other existing data unless it receives a commit command within the predetermined time interval. Other examples are also possible.

Reflecting back on the principles discussed thus far, a host delegates processing functions to a nonvolatile memory controller, e.g., a flash memory controller. Conventionally, flash memory is characterized by long programming times, multiple program-verify cycles to ensure proper memory cell programming, and program-erase asymmetries. The described techniques increase the predictability of memory controller/memory response for this type of memory using techniques that permit, depending on embodiment, the host to schedule either the time when redundancy information is committed to memory or to program the destination, and to interleave other data access and maintenance operations around these offloaded processes and the implicated memory destinations.

Having thus introduced these techniques, this disclosure will now proceed to discuss design associated with a pseudo-expositive memory controller, used in connection with some of the embodiments herein, with reference to FIGS. 2A-3G. Further detail regarding the design and features of such a memory controller can be obtained from U.S. Utility application Ser. No. 15/074,778.

A memory controller subdivides an incoming memory address into multiple discrete address fields corresponding to respective hierarchical groups of structural elements within a target nonvolatile semiconductor memory system, in which at least one of the discrete address fields constitutes a virtual address for the corresponding physical element within the structural hierarchy. Through hierarchical subdivision, a virtual address portion of an incoming memory address is ensured to resolve to an element within the physical bounds of a larger (hierarchically-superior) structure, but may be freely mapped to any of the constituent physical elements of that larger structure. Accordingly, a host requestor may issue logical memory addresses with address fields purposefully specified to direct read, write and maintenance operations to physically distinct structures within the memory system in a manner that limits performance-degrading conflicts while the memory controller remains free, by virtue of one or more virtualized address fields within the incoming logical addresses, to virtualize localized groups of physical structures and thus mask defective structural elements and swap operational structural elements into and out of service, for example, as they wear or otherwise require maintenance.

The net storage volume of a nonvolatile semiconductor memory system can be subdivided into discrete performance-isolated storage regions based on specified system requirements and underlying memory system geometry and performance characteristics, with each such storage region being mapped by an independent linear range of logical addresses. Accordingly, each performance-isolated storage region may be presented to one or more host access requestors as an independent block device (i.e., mass storage unit having a continuously mapped logical address space) so that the nonvolatile memory system may be perceived by that host as being constituted by multiple discrete block devices, each having its own performance characteristics and address space. Moreover, the mapping of the logical address space within a given block device, referred to herein as an address space layout, or "ASL," may vary from one block device to another (e.g., sequential addresses within logical address ranges of respective block devices may be distributed within the structural hierarchy of the memory system in different order) to yield configurable and varied block device characteristics in terms of erasable segment size, endurance and I/O bandwidth. Further, multiple different address space layouts may be applied within different "subspaces" of a given block device (i.e., discrete portions of the block device's address range) with, for example, addresses in one subspace being sequentially applied to structural elements at different hierarchical levels of the memory system in a different order than in another subspace. Also, in a number of embodiments, system requirements specified (e.g., by a user/system designer) in terms of block device capacity and performance metrics including, without limitation, read and write bandwidth requirements and minimum data transfer size required by the block device, are automatically translated into corresponding configuration and allocation of structural elements as necessary to meet the high-level requirements, with such configuration and allocation optionally being programmed directly into the nonvolatile memory subsystem and/or corresponding block device definition reported to a host access requestor. By this approach, a system designer may configure and allocate block devices according to performance requirements of the application at hand without having to resort to the complex and error-prone task of allocating and configuring numerous physical resources within the nonvolatile memory system individually. As noted previously, in one embodiment, the host can dynamically readjust its subdivisions so as to periodically or on demand further optimize memory. For example, as referenced below, information returned by a memory controller (e.g., metadata representing compression, back references and other information, returned as part of the various processes described herein) can be applied to a machine learning algorithm and applied by the host to reconfigure address space depending on data stored, system and application requirements; to cite one particular example, dependent on returned compression parameters (from an offloaded Compression operation), a host has the ability not only to select a write location for specific compressed data, but can change its address space configuration as a general matter (i.e., as a result of machine learning and consequent storage system re-optimization).

The nonvolatile memory subsystem is presented as a flash memory device forming in whole or part a solid state disk drive (SSD); the flash memory device can be hierarchically arranged in multiple wired signaling channels each coupled to multiple flash memory dies, with each die including numerous individually erasable storage units ("erase units" or erase blocks or flash blocks) distributed in one or more access planes, and with each erase unit including numerous pages constituted by a predetermined number of single-bit or multi-bit nonvolatile storage cells (i.e., channels, dies, erase units and pages constitute, for example and without limitation, respective hierarchical physical elements within the flash memory device). For example, in one embodiment, a memory controller within the flash memory system (e.g., within the drive or SSD) subdivides each incoming LBA into respective channel, die, erase unit and page address fields, any or all of which may be virtual addresses, and resolves a commanded read or write access to a specific channel indicated by the channel address field, a specific die indicated by the die address field, a specific erase unit indicated by the erase unit field (including possible resolution to two or more erase units in the case of multi-plane command sequences) and a specific page indicated by the page address field (including possible resolution to two or more pages in the case of a multi-page operation). Where the memory controller maintains reserve units, for example mapping host-visible address space to reserved structural elements at a given level of the hierarchy, some limited address translation can be performed at the memory controller, e.g., by translating the address of one block in the hierarchy (e.g., erase unit) while preserving logical location level at other address levels (e.g., preserving page ordering within a remapped erase unit). Among other advantages, this architecture provides for greatly simplified address translation (e.g., which can optionally be implemented entirely in hardware or mostly in hardware with various alternative, small address translation tables being used for select structural elements in the hierarchy, e.g., for each die, facilitating configurable and predictable I/O latency, by shortening address translation time and eliminating associated complexity. As noted previously, in other embodiments, such reserved structural elements units can also/instead be used to supply storage units for redundancy information, such as ECC data, as specified by the ASL information.

Figure 2A:
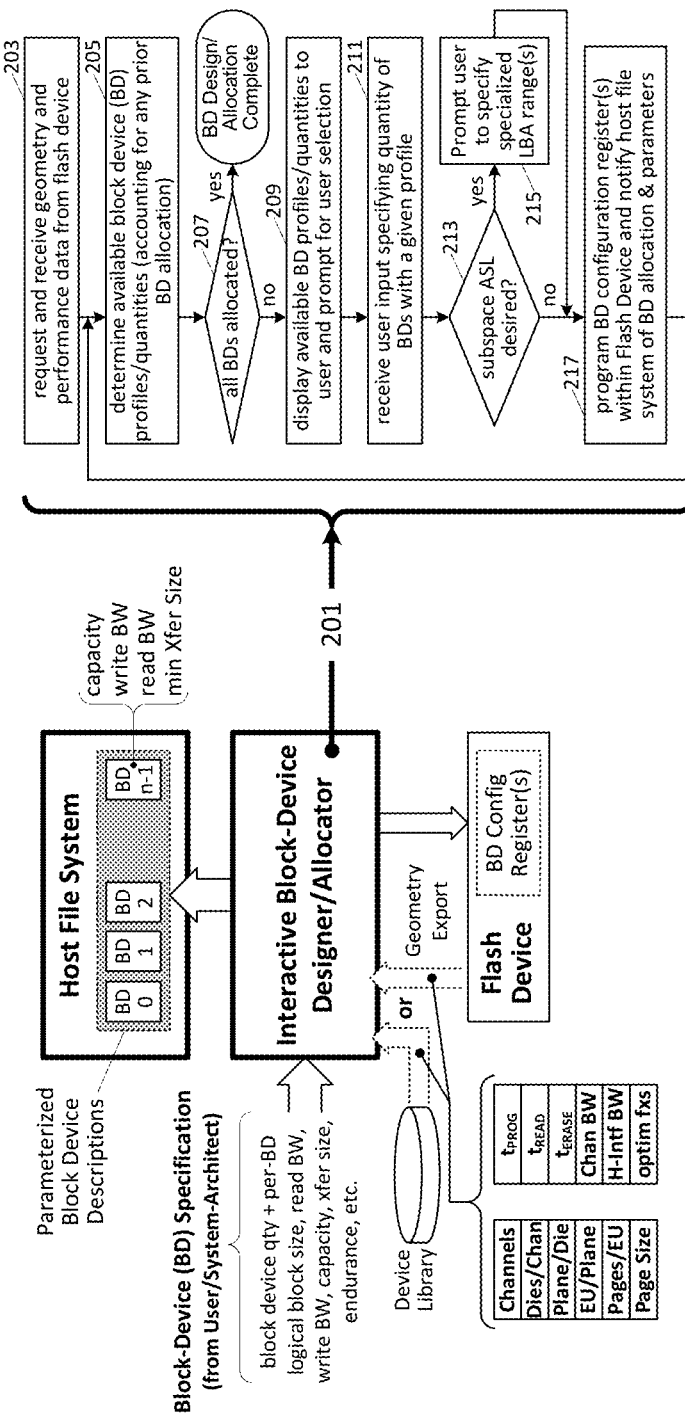
FIG. 2A illustrates an exemplary application and configuration of a flash device having a pseudo-expositive memory controller.

FIG. 2A illustrates an exemplary application and configuration of a flash device having such a "pseudo-expositive" memory controller. In the particular embodiment shown, an interactive block-device designer/allocator is executed within either the flash device, host system and/or separate computing device to obtain flash device geometry and performance characteristics and interact with a system designer (i.e., user, system architect or other human operator or programmed intelligence) to define and allocate one or more discrete performance-isolated storage regions within the flash device. The block device designer/allocator ("block device allocator" for short) supplies parameterized descriptions of each allocated flash storage region to a host file system (i.e., one or more threads or processes executed on a host computing system to carry out file storage, retrieval and maintenance operations with respect to files and other data objects) which, accordingly perceives each such flash storage region as a linear range of logical block addresses and thus as an independent block device.

Still referring to FIG. 2A, and more specifically to the exemplary operational flow at 201, the block device allocator initially requests and receives geometry and performance data from the flash device and/or a device library at 203. In the embodiment shown, the geometry information includes hierarchical topology information including, for example and without limitation, (1) the number of independent flash-die access channels (also referred to herein as "signaling channels" or simply "channels") coupled to or otherwise accessible by the memory controller, (2) the number of discrete flash dies coupled to each access channel, (3) the number of erase-unit planes (or "planes" for short) within each flash die, (4) the number of erase units within each plane, (5) the number of pages per erase unit and (6) the storage capacity of each page. In general, each of the device geometry parameters may be a physical (i.e., actual) or pseudo-physical representation of the corresponding underlying hierarchical structure (e.g., channels, dies, planes, erase units or pages). Performance data, which may be viewed as part of the geometry export, may include for example and without limitation, (a) the nominal programming time of a physical page within the erase unit of a flash die (i.e., "$t_{PROG}$" also referred to herein as the page write time), (b) the nominal read time of the physical page ($t_{READ}$), (c) the nominal time required to erase contents within an erase unit ($t_{ERASE}$), (d) the data transfer bandwidth over an individual access channel (Chan BW), (e) the data transfer bandwidth of the host interface (H-Intf BW), (f) various performance enhancement/optimization functions that may be available (e.g., multi-page functionality, read caching, write caching, etc.), and so forth.

At 205, the block device allocator determines the available block device profiles (i.e., physical and performance characteristics of different configurations of physical resources within the flash device) accounting for any pre-existing allocations. Assuming that no block devices have been allocated at this point and thus that resources sufficient for further block device definition remain within the flash device (i.e., negative determination at decision 207), then the block device allocator displays (e.g., in a visible display or other user interface of the computing device in which the block device allocator is instantiated) available block device profiles and the allocable quantities of each as shown at 161, prompting the user/designer to select one or more block device profiles and their desired allocation quantities. Upon receiving user input specifying a quantity of block devices having a given profile (and possibly multiple different profiles and respective quantities) at 209, the block device allocator prompts the user/designer to specify, for each block device to be allocated, whether the LBA range of the block device is to be uniformly sequenced among the hierarchical structures of the flash storage region to be allocated (e.g., channels, dies, erase units, pages) thus establishing a uniform address space layout (ASL) for the block device, or whether the address space layout is to be varied within one or more "subspaces" of the block device (i.e., "sub-ranges" of the overall LBA range for the block device). If subspace ASL is desired (affirmative determination at 213), the user is prompted to specify one or more specialized LBA ranges (i.e., LBA ranges having ASLs different from the otherwise uniform ASL corresponding to the block device profile). After receiving subspace ASL specifications, if any, for each user-requested block device, the block device allocator programs block device configuration registers 215 within the flash device (thereby allocating individually configured block devices within the flash device) and notifies the host file system of the block device allocation, supplying, for example a parameterized description of each block device that informs the host file system of the block device capacity (thus establishing the LBA range of the block device for a given LBA granularity), write bandwidth, read bandwidth, erasable segment size and minimum data transfer size.

Note that the LBA granularity (i.e., size of a logical block of data—not to be confused with a block device which will typically hold millions of logical blocks of data each having a respective LBA range) may be programmed within the block device configuration registers or other configuration storage of the flash device to enable a variable user-specified number of LBAs to span each physical page of storage within the flash device. Similarly, as discussed in greater detail below, the size of a logical quantum of data, referred to herein as a "host data segment" or "segment" and that constitutes a fundamental unit of storage allocation operated upon by the host file system, may be programmed within the block device configuration register to enable the memory controller to associate discrete sets of physical storage structures (e.g., an integer number of erase units within a given block device) with respective segments and thereby facilitate coordinated file-system and flash device management operations.

Continuing with the block device allocator flow, after programming the block device configuration registers and exporting corresponding block device parameters to the host file system at 217, the block device allocator returns to the space availability evaluation at 205, and determines the block device profiles and quantities thereof that remain available for allocation after accounting for any prior allocations at 217. If all available block devices are determined to have been allocated (i.e., all resources reported to be available by the flash memory device and/or library description of the flash memory device have been allocated in a block device definition or respective block device definitions), then the block device design/allocation operation is deemed complete and the block device allocator terminates. Though not specifically shown, the designer/user of the block device allocator may also terminate the block device allocation sequence without allocating all flash resources.

Reflecting on the block device allocation sequence shown in FIG. 2A, it should be noted that numerous additional provisions and or options may be implemented in various embodiments. For example, instead of executing the flash memory/file system configuration operation at 217 in each loop iteration, the block device allocator may accumulate an internal set of flash device and flash memory configuration parameters in each loop iteration, prompting the user/designer to review a comprehensive allocation plan before proceeding with flash device programming and/or file system notification. Also, instead of issuing configuration commands/parameters to the flash memory device and/or host file system, the block device allocator may write configuration information to one or more configuration files (or other data objects) for later delivery to actual flash memory devices or host file systems. Further, instead of iteratively prompting a user to select from among available block device profiles (which selection constitutes an implied or explicit user/designer specification of block device characteristics, including logical block size, read bandwidth, write bandwidth, capacity, transfer size, endurance metric, etc.), the block device allocator may initially receive desired block device performance parameters from a user/designer and thus proceed from the user's initial performance specification to resolve block device allocations. In yet other embodiments, the quantity of block devices and/or their individual characteristics may be determined in whole or part by user/designer specification of aggregate read or write bandwidth within the flash device as a whole (together with other "overall device" requirements, such as a minimum segment size, logical block size and/or transfer size), with the block device allocator allocating and configuring, for example, a minimum or maximum number of block devices as necessary to meet those aggregate requirements. Also, as noted previously, the block device allocator can be configured for machine learning and so can change storage system parameters and/or write parameters according to information dynamically supplied by the memory controller (e.g., by changing where certain data is stored dependent on compression parameters returned by the host, or dependent on other metadata such as back references, deduplication information, or other information returned by the memory controller). Accordingly, the iterative block device allocation sequence shown in FIG. 2A should be understood as but one of many possible block device allocation schemes which may be deployed in different embodiments or configurations.

Figure 2B:
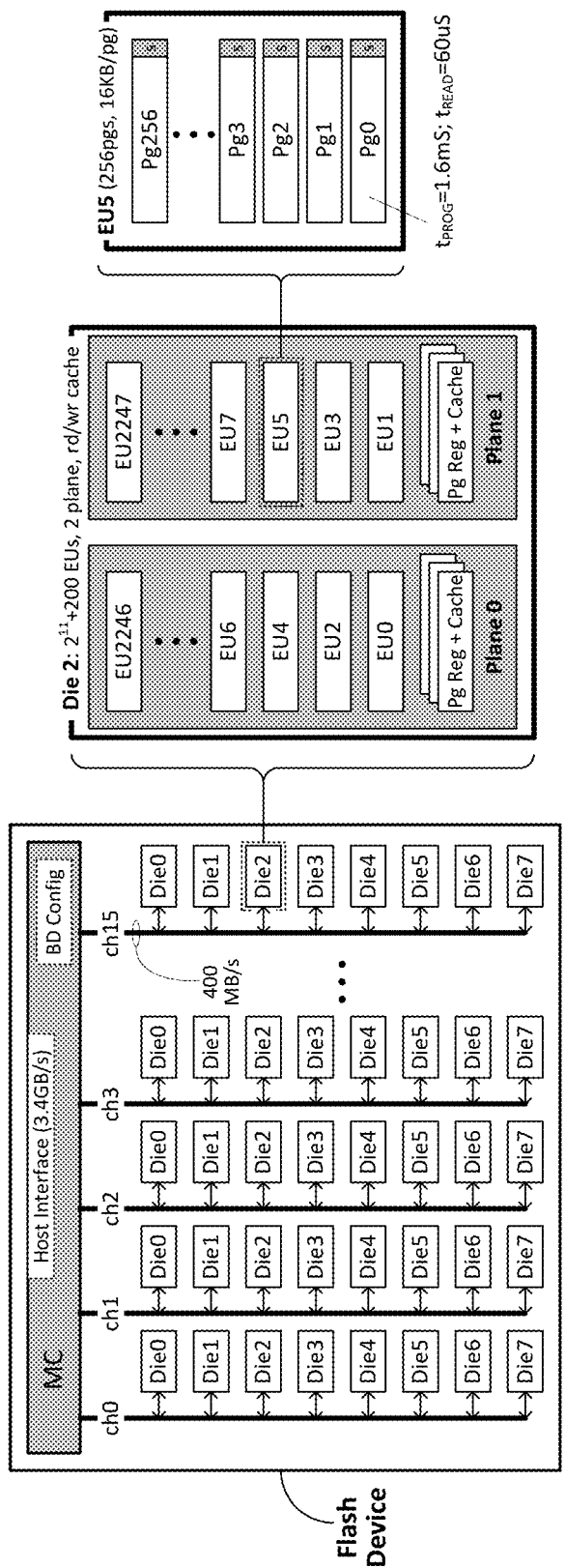
FIG. 2B illustrates an exemplary flash memory device in which discrete block devices may be configured and allocated.

FIG. 2B illustrates an exemplary flash memory device in which discrete block devices may be configured and allocated as described in FIG. 2A. For purposes of explanation and understanding only, a specific flash device geometry and set of performance metrics are shown in FIG. 2B and carried forward in a number of embodiments described in reference to following figures of the drawing. In all such cases, the specific geometries (e.g., numbers of physical elements at each hierarchy within the flash device structure including, without limitation, access channels, flash dies per channel, planes per flash die, erase units per plane, pages per erase unit, page size, page read and write times ($t_{READ}$ and $t_{PROD}$, channel bandwidth and host interface bandwidth, number of host interfaces, etc.) may be different from those shown in FIG. 2B.

With that understanding, it can be seen that the exemplary flash device in FIG. 2B includes a memory controller coupled to 16 access channels (ch0 . . . ch16), with each access channel coupled to eight flash dies, each flash die having two planes, and each plane containing 1124 erase units (2248 erase units per die), and each erase unit containing 256 pages each containing a number of flash memory cells (e.g., NAND memory cells, though NOR or NAND flash memory cell configurations may be deployed in alternative embodiments) sufficient to store 16 kilobytes (kB) of data. As an aside, references to volumes of data herein are generally intended to mean a power of two quantity so that KB, MB, GB, TB, etc. refer respectively to $2^{10}$, $2^{20}$, $2^{30}$, $2^{40}$, etc. byte of data (sometimes designated by KiB, MiB, GiB, TiB and so forth).

Continuing with the flash memory embodiment shown in FIG. 2B, for purposes of example, it is assumed that the geometry exported to the block device allocator accurately reflects the underlying structural/physical hierarchy in all aspects but one—that the number of erase units per plane is reported pseudo-physically as 1024 (i.e., $2^{10}$ and thus $2^{11}$ or 2048 erase units per die) instead of 1124, meaning that 100 erase units per plane and thus 200 erase units per die are held in reserve. As explained below, this erase unit reservation or "spare pool" enables the memory controller to virtualize the available erase units within each die and thus mask defective erase units from host visibility and swap erase units into and out of service as storage for respective LBA ranges of an allocated block device without impacting the host perspective of the block device or the flash device as a whole. Also, it bears emphasis that each virtualized collection of erase units is confined to the individual flash die (or even the individual planes, depending on block device configuration) containing the corresponding physical erase units. That is, while a given LBA that resolves to a flash die may include a virtualized erase-unit address field (an example of a discrete address field within the LBA corresponding to a group of physical elements within a structural hierarchy—erase units in this case), the LBA is nonetheless guaranteed by design to resolve to a physical erase unit with the LBA-specified physical die on the LBA-specified physical channel. More generally, as discussed in greater detail below, while any address field (i.e., contiguous or discontiguous ranges of bits within an incoming LBA) corresponding to a hierarchical group of structures (e.g., channels, dies, erase units, pages) may be virtualized such that one or more of the corresponding hierarchical structures may be held in reserve, the address-space division between the hierarchical structures is maintained. Thus, once the channel field of an LBA is resolved to a particular channel, it is assured that, despite possible virtualization of the sub-hierarchical fields (i.e., die field, erase unit field and/or page field within the LBA), the LBA will ultimately resolve to a physical page on a physical die on that particular channel. This principle holds true for each level of the structural hierarchy so that once the LBA is resolved to a particular die, it is assured that the remaining erase unit and page fields, even if one or both are virtualized, will resolve to a physical page within that die, and likewise an LBA resolved to a particular erase unit is assured to specify a physical page within that erase unit, despite possible virtualization of the LBA's page field. Through this arrangement, it becomes possible to virtualize physical structures at each hierarchical level within the flash device while guaranteeing access to discrete subdivisions of the flash storage and thereby permitting, for example, specification of discrete subsets of dies and channels (or even finer-grained hierarchical elements where it makes sense to do so) to respective block devices specified within the block device configuration storage.

FIGS. 3A-3G will be used to discuss how this architecture can be used to configure VBDs.

Figure 3A:
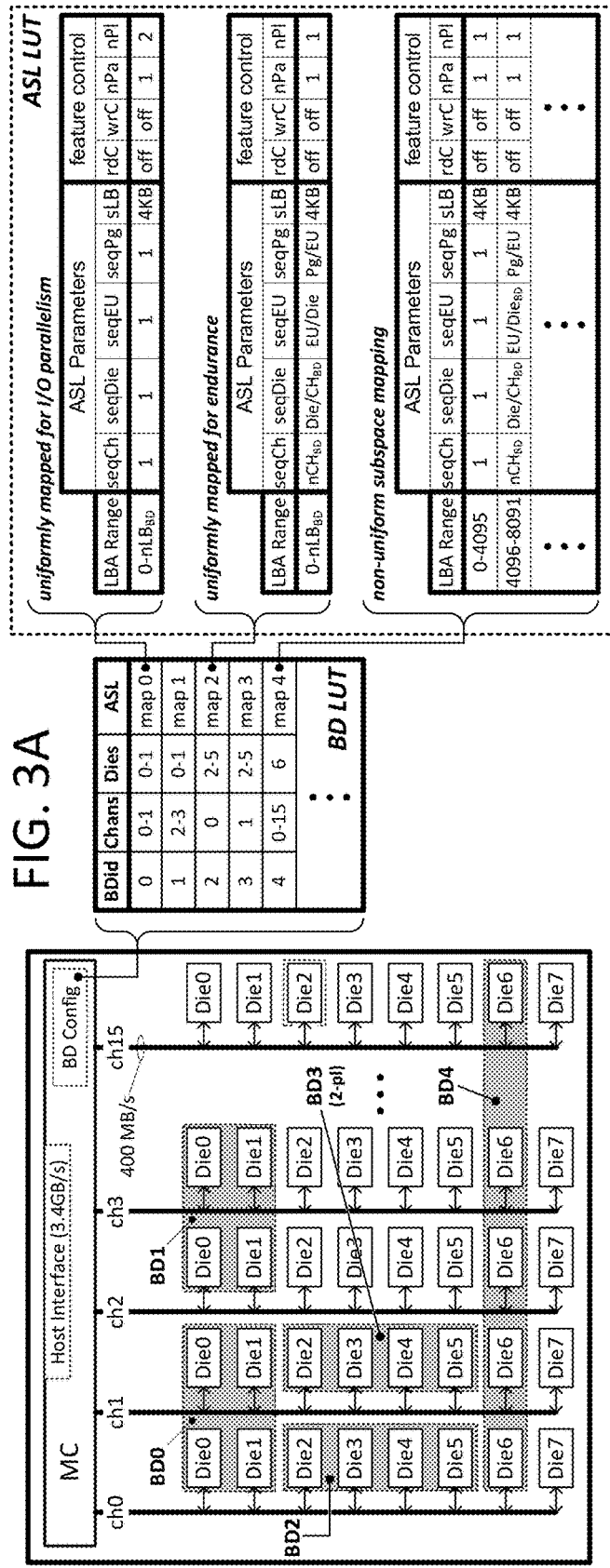
FIG. 3A illustrates an exemplary block device allocation and configuration within the flash device of FIG. 2B.

More specifically, FIG. 3A illustrates an exemplary (and not necessarily complete) block device allocation and configuration within the flash device of FIG. 2B effected, for example, using the block device allocator described in reference to FIG. 2A. As shown, five block devices, BD0-BD4, are allocated, with each block device being constituted by one or more flash dies that are collectively associated with one or more memory channels (i.e., in this example, the smallest allocable block device is a single flash die). The block device configuration storage (BD Config) includes a block device lookup table (BD LUT) that is indexed by a block device identifier (BDid which may be, for example, a namespace or other handle or identifier) and holds, for example and without limitation, a specification of the one or more channels spanned by the block device (i.e., "constituent channels") and the one or more dies on the constituent channels. For instance, block device 0 (BD0) spans channels 0 and 1, and includes dies 0 and 1 on the constituent channels and thus includes four flash dies in all. Block device 1 is similarly defined as encompassing a 2×2 set of flash dies, but spans channels 2 and 3 instead of 0 and 1 and thus forms an entirely discrete storage area (i.e., no physical overlap) with respect to block device 0. Block device 2 spans a single channel (channel 0) and flash dies 2-5 on that channel, and thus also constitutes a four-die block device, but without the channel parallelism of block devices 0 and 1 (i.e., a 1×4 block device instead of a 2×2 block device). Block device 3 is also a four-die 1×4 block device, but is constituted by allocation of dies 2-5 on channel 1 instead of channel 0. Lastly, block device 4 is a 16-die block device that includes a single die (die 6) all 16 channels—that is, a 16×1 block device. Thus, of the overall set of five allocated block devices, four block devices (BD0-BD3) include discrete sets of four constituent dies and thus have a 32 GB pseudo-physical storage capacity (i.e., each die includes a pseudo physical count of 2048 erase units, each containing 256 16 KB pages and thus $2^{11}*2^{8}*2^{14}$ bytes or 8 GB) and the fifth block device (BD4) includes a discrete set of sixteen dies and thus a 128 GB pseudo physical storage capacity. Also, in this particular example, the channel and die identifiers recorded within the block device lookup table correspond one-for-one with underlying physical channels and dies within the flash device as neither of those elements of the structural hierarchy are virtualized. In alternative embodiments or configurations of the flash device, either or both of those elements may be virtualized.

Continuing with FIG. 3A, each entry within the block device lookup table additionally includes an index to a respective set of one or more entries within an ASL lookup table (ASL LUT), with each ASL lookup table entry including ASL (address space layout) parameterizations and feature control settings for the complete or partial LBA range of the corresponding block device. In the particular example shown, ASL/feature-control parameter settings for three different block devices are illustrated, including a uniform ASL/feature-control parameterization within block device 0 (i.e., parameterization applies uniformly to the entire LBA range of the block device—there are no subspace definitions), another uniform ASL/feature-control parameterization with block device 2, and another multi-subspace ASL/feature-control parameterization within block device 4, with separate ASLs defined for each of multiple LBA ranges within the block device, only two of which are shown. Entries for block devices 1 and 3 are also present in the ASL lookup table, but not specifically shown in FIG. 3A.

As discussed above, the ASL parameters define the manner in which sequential LBAs are distributed within the structural hierarchy of the block device and thus indicate the number of pages within the same erase unit (i.e., "seqPg") to which sequential LBAs apply before progressing to page(s) in the next erase unit, and then the number of erase units to be sequentially accessed within a given die ("seqEU") before progressing to the next die, and then the number of dies to be accessed on a given channel ("seqDie") before progressing to the next channel. The feature control parameters include, for example and without limitation, whether read caching and write caching are to be enabled (independently settable via the rdC and wrC fields of the ASL lookup table entry) for the block device or subspace thereof, the number of pages that may be simultaneously or concurrently written to or read from within the same erase unit (nPa), and the number of erase-unit planes to be concurrently accessed in a given write or read command sequence (nPI). In general, read caching is a double-buffering construct that enables data retrieved from an address-selected storage page and stored within the flash die's page register (i.e., a buffer element that temporarily holds outbound page-read data and inbound page-write data) to be output from the flash die concurrently with transfer of subsequently selected storage-page data to the page register, and write caching is a similar double-buffering arrangement that enables concurrency during page-write operations. Thus, the read and write page caching features, when enabled, reduce net latency of a sequence of read or write operations, respectively. In general, page caching scales (e.g., multiples according to cache depth) the effective size of the page register and thus correspondingly raises the minimum data transfer size imposed on the host in a given page read or write operation. For simplicity of understanding, page caching in both the read and write directions is disabled (i.e., "off") within the exemplary ASL lookup table entries shown. Multi-page operation (i.e., nPA set to a value greater than one) and multi-plane operation (nPI set to a value greater than 1) likewise raise the minimum data transfer size between the host and memory controller. In the specific examples shown in the ASL lookup table of FIG. 3A, multi-page operation is disabled at least within block devices 0, 2 and 4, and multi-plane operation is disabled at least within block devices 2 and 4. By contrast, dual-plane operation (nPI=2) is specified for block device 0, thus doubling the number of concurrently written pages (a block device characteristic referred to herein as a "stripe size" or "frontier width") as compared to a physically-comparable block device (e.g., block device 1) configured for single-plane operation.

Still referring to FIG. 3A, the singular values ('1') recorded for the LBA-sequencing ASL parameters within the ASL lookup table entry for block device 0 dictate that LBAs are to be distributed widely through the structural hierarchy of the flash device with, for example, each page of a sequentially addressed set of four pages (and thus a sequential range of 16 LBAs given the sLB=4 KB logical block size setting) being read or written within a different one of the four constituent dies of the block device, thus effecting 4× ("multiplied-by-four") parallelism in the page read or write operation and thus approximately a 4× bandwidth increase over a configuration that directs four sequential page read or write accesses to the same erase unit within a given die. In actuality, the dual plane setting within block device 0 doubles the number of concurrently accessed pages within each of the four constituent flash memory dies of block device 0, thus establishing an 8-page stripe size and thus read and write bandwidths that are approximately eight times the baseline single page read and write bandwidths of a given flash die. By contrast, block device 1 which otherwise constitutes the same 2×2 die-layout as block device 0, is configured with a deep (rather than wide) address space layout and with only single-plane access throughout its LBA range. Thus, pages falling within a sequential LBA range of block device 1 are mapped to physical pages within an erase unit until the end of that erase unit is reached (i.e., "Pg/EU"), with the LBA range thereafter continuing through the physical pages of a next erase unit and then the next until the final erase unit (EU/Die) within the die has been traversed, with the LBA range thereafter continuing through the pages and erase units of the next die on the same channel before carrying over to EUs and dies on an adjacent channel. In general because the stripe size is very narrow (i.e., a single page and thus as narrow as possible in the exemplary flash memory die shown), only a single erase unit is impacted by each page write operation and thus, despite the relatively low write bandwidth (i.e., 16 KB/$t_{PROG}$ in contrast to the 8*16 KB/$t_{PROG}$ bandwidth achieved by the 8× wider stripe size in block device 0), write-induced wear resulting from, for example, storage of a 16 MB host segment, will occur in only a relatively small number of erase units and dies—four 4 MB erase units within the same die in this example—in contrast to the storage of each of the 1024 16 KB pages within a respective one of the 1024 erase units of block device 0 (i.e., each of the 256 erase units within each of the four dies is written to and thus worn to some degree). Conceptually, while the total page wear is equivalent in both block die configurations (the same number of pages is written), the wear within narrower-stripe-size (i.e., deeper, but lower bandwidth) block device 1 is concentrated within a much smaller number dies (and potentially erase units as well), simplifying wear-leveling operations and thus raising endurance of the block device as compared to wider, higher-bandwidth block device 0. In general, all these considerations are made available to the user/system designer in configuring the block devices, as the designer is able to directly, or with the aid of the block device allocator, specify ASL and feature-control parameters that strike a design balance between endurance and bandwidth requirements of a given application, potentially configuring block devices having widely varying performance characteristics within the same flash memory device, as illustrated by block devices 0-4 in FIG. 3A.

Concluding with FIG. 3A, the ASL lookup table includes multiple entries (and thus multiple subspace definitions) for block device 4, with an initial entry specifying a 4K LBA range (0-4095) mapped for high I/O bandwidth (i.e., 16-page stripe size as the write frontier spans all sixteen of the flash dies within the block device) and another entry specifying a subsequent 4K LBA range mapped for endurance (single-page stripe size). One or more other subspace definitions (not shown) complete the LBA range mapping of block device 4.

Figure 3B:
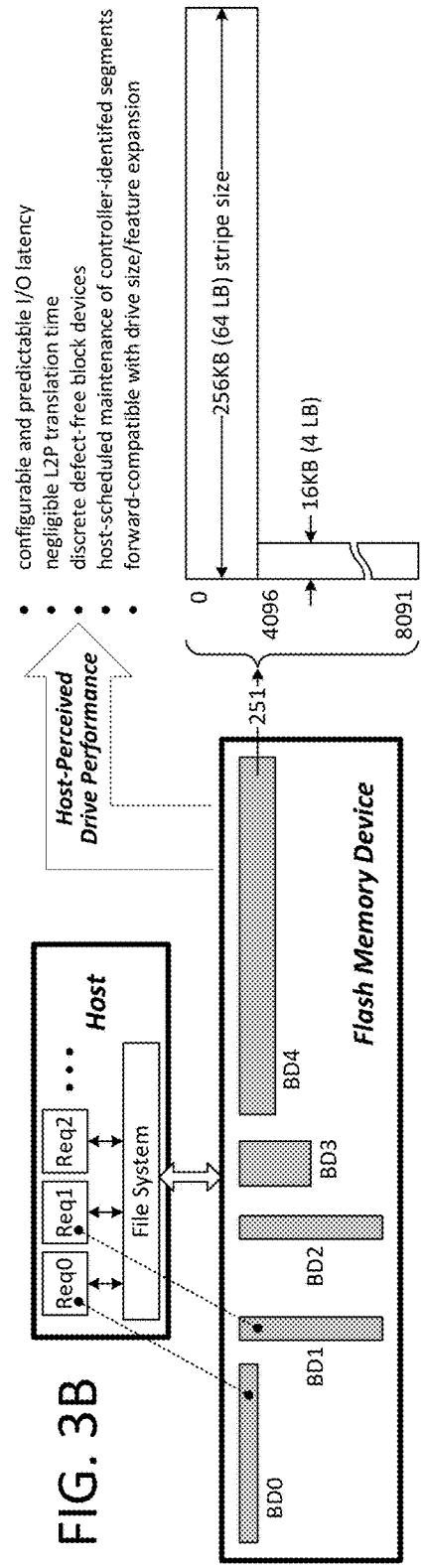
FIG. 3B illustrates a host perspective of the exemplary block device allocations and configurations presented in FIG. 3A.

FIG. 3B illustrates a host perspective of the exemplary block device allocations and configurations presented in FIG. 3A, showing relative block device capacities by the area/footprint of the block devices (as will be the case within the physical flash storage media) and illustrating relative block device bandwidths according to block device width (left-to-right across the drawing figure). Thus, block devices 0-3 all have the same four-die, 32 GB capacity and thus have the same footprint (i.e., spanning an equivalent area within the figure), while block device 4, encompassing four times as many flash dies as each of the other block devices has a correspondingly larger 128 GB capacity. Also, block devices 0, 1, 2, 3 and 4 are depicted with respective widths according to their nominal maximum I/O bandwidths of 8×, 1×, 1×, 2× and 16×, respectively, where each non-unity multiplier scales the baseline read and write bandwidths (i.e., 1/$t_{READ}$ and 1/$t_{PROG}$) As shown in detail view 251, the signaling bandwidth of block device 4 varies according to subspace, having a high (16×) bandwidth in the initial LBA range, and a 1× bandwidth in the LBA range that follows (i.e., in accordance with the respective subspace stripe sizes of 256 KB and 16 KB). Note also that actual block device bandwidths may be constrained by peak channel and/or host interface signaling rates, particularly in the case of memory read operations. For example, because the host interface is shared between all block devices (at least in the single host-interface embodiment shown in FIGS. 3 and 4) and individual access channels may be shared by as many as eight block devices (or more or fewer according to the number of flash dies per channel), operations executed in one block device may cut into the signaling bandwidth needed for peak-rate operation within another block device, particularly where numerous high-bandwidth block devices share the same signaling access channel or a large number of block devices are allocated within the flash device (which may saturate the host interface during occasional concurrent read access within a threshold number of block devices).

FIG. 3B also presents a non-exhaustive list of flash device performance characteristics and features enabled by hierarchical address virtualization within the memory controller and configurable block device allocation, including (i) a configurable and predictable I/O latency, (ii) brief or otherwise negligible logical-to-physical ("L2P") address translation time (or at least dramatically reduced L2P time relative to operating modes that invoke a flash translation layer), (iii) allocation of discrete defect-free block devices in user-specified quantities and capacities, (iv) host-scheduled maintenance of flash-device-identified segments (or other logical units of storage), and (v) forward compatibility/ease of migration as flash device capacities and feature sets expand in successive device generations. Each of these characteristics/features is discussed in greater detail below.

FIG. 3C illustrates an exemplary pair of block device configurations that demonstrate the configurable and predictable I/O latency enabled by the pseudo-expositive flash device described above (i.e., flash device having a pseudo-expositive memory controller) and the user-configurable block device allocation therein. These configurations will be respectively referred to as "configuration A" and "configuration B," with it being understood that a device may be reconfigured dynamically or otherwise as desired, as indicated by the presence of a migration arrow separating these two configurations. As shown, each of the block configurations features a 2×2 disposition of four dies (i.e., two dies coupled to channel 0 and two dies coupled to channel 1) and two planes of erase units within each die. That is, the block device configurations represent physically identical geometry and capability. However, by programming a wide and shallow ASL (i.e., ASL parameters set to distribute sequential LBAs through a minimum number of physical structures at each level of the structural hierarchy) and enabling dual-plane operation, an 8-page I/O stripe width is implemented with block configuration A and thus an 8 page/$t_{PROG}$ write bandwidth and 8 page/$t_{READ}$ read bandwidth, assuming sufficient overhead within the host-interface and flash-die access channels (as indicated by the 8 EU's in bold in the left-most grouping of 4 dies in FIG. 3C). By contrast, block device configuration B features a narrow and deep ASL (i.e., ASL parameters set to distribute sequential LBAs through a maximum number of physical (or pseudo-physical) structures at each level of the structural hierarchy) and for single-plane operation, so that a single-page stripe size is established and thus write and read bandwidths of only 1 page/$t_{PROG}$ and 1 page/$t_{READ}$, respectively. As explained above, the sequencing of LBAs through all the physical (or pseudo-physical) structures of a given die before proceeding to the next die increases endurance of the block device relative to its wider-stripe-width counterpart. Accordingly, the ASL of a given block device within the pseudo-expositive flash device may be tuned to meet endurance and bandwidth targets of a given application.

FIG. 3D illustrates an exemplary generation of a physical block address in response to an incoming LBA (i.e., logical block address provided by host in connection/association with a memory access or maintenance operation) and block device ID (BDid). As shown, the block device ID is applied to a block device lookup table (e.g., as described in reference to FIG. 3A) to retrieve information identifying the channels and dies that constitute the block device (i.e., allocated to the block device) and thus, base die and base channel values that specify starting boundaries within a physical or pseudo-physical die matrix, together with parameters that indicate a number of channels and dies per channel spanned by the block device (Chans, Dies/Chan). In other embodiments, the constituent dies and channels of the block device may be specified in other ways (e.g., list of specifically identifiable dies, starting channel/ending channel together with starting die/ending die, etc.).

In the implementation shown, the block device lookup table also outputs an ASL lookup address to the ASL lookup table. The ASL lookup table, in turn, outputs the recorded ASL parameters (including logical block size if implemented as a variable parameter) to an ASL generation logic block which in turn outputs an address-space-layout value that enables the incoming LBA to be decomposed into a set of hierarchical "sub-address" values, one sub-address for the group of elements at each respective level of the structural hierarchy within the flash device (e.g., channel sub-address, die sub-address, erase-unit sub-address, page sub-address).

This LBA decomposition into sub-addresses is easiest understood by considering the special case in which each sub-address maps to a power-of-two number of corresponding hierarchical elements (e.g., $2^4$ channels, $2^3$ dies per channel, $2^{11}$ erase units per die, $2^8$ pages per erase unit) as, in that case, the ASL indicates, in effect, the location of discrete bit fields within the incoming LBA that correspond to respective levels of the structural hierarchy. Moreover, as shown in the shaded examples of ASLs for block devices 0-4 (BD0-BD4) at, the ASL also identifies the position of each discrete bit field within the ASL—a consequence of the sequential LBA assignment parameters described above in reference to FIGS. 4 and 5. Considering the ASL for block device 0, for example, it can be seen that, except for the page offset fixed at the lowest bits of the incoming LBA, the channel sub-address field constitutes the least significant field of the BD0 ASL, followed by the die sub-address field, the erase-unit sub-address field and then the page-address sub-address field. Accordingly, assuming for example that the page offset is a two-bit field such that four logical blocks are stored within each flash page, then every fourth LBA in a linear sequence of LBAs will be written within a die on a different channel with modulo wrap around to an initial channel after a die on the final channel has been written. By contrast, the sub-address (or field) order in the block 1 ASL is exactly the opposite that of block device 0 (excepting the least-significant page offset field), such that pages are sequenced first, then erase-units, then dies, and then channels at the end.

Continuing with FIG. 3D, as the ASL indicates how the individual hierarchical sub-address fields have been packed or encoded within the incoming logical block address, that value is supplied to pseudo-physical address generator and used therein to extract (or unpack or decode) or otherwise recover the individual hierarchical sub-addresses. In the particular example shown, the erase-unit sub-address (EU-virt) is assumed to be a virtual address (e.g., resolving between 2048 possible erase units within a die having, in actuality, some larger number of erase units) which is therefore supplied to a sub-address translation table (or lookup table) for un-mapping to the physical address of the erase unit to be accessed. In the particular example shown, the remaining sub-address fields are assumed to be physical addresses corresponding to respective levels of the structural hierarchy so that those sub-address fields, together with the output of the translated erase-unit address (EUphys) constitute a physical block address that may be supplied to address decoding logic to issue the necessary control and enable signals to effect access to the specified page of flash storage (at the offset specified by the page offset).

In an alternative embodiment, the channel, die, page and page-offset sub-addresses (or any subset thereof) recovered from the LBA are also virtual addresses and thus supplied to respective sub-address translation or lookup tables (Ch LUT, Die LUT, Pg LUT, PO LUT) to obtain or generate the corresponding physical sub-addresses. More generally, any or all of the sub-address fields (including the page offset) recovered from the inbound LBA may be virtual addresses that are converted to physical addresses through translation/lookup operations. Also, two or more of the lookup tables for different hierarchical levels may be merged or combined. For example, the channel and die lookup tables may be merged to enable a two-dimensional lookup, thus virtualizing the die array as a whole and enabling any die on any channel to be interchanged (i.e., through virtual-to-physical address translation) with any other die on the same channel or any other channel.

A conceptual view of an erase-unit virtual-to-physical (V2P) translation table implementation is shown conceptually in the bottom portion of FIG. 3D to demonstrate that a channel and die, selected by one of numerous constituent erase-unit lookup tables (or translation tables) is selected to yield the physical erase-unit address (i.e., to provide for independent erase-unit mapping from die to die). Various other implementations may be deployed in alternative embodiments.

A number of points bear emphasis in view of FIG. 3D. First, as the individual sub-address fields are, by virtue of block device and ASL programming, modulo-encoded into the incoming logical block address (e.g., as respective bit-fields in the power-of-two example shown), the sub-address values may be deterministically (e.g., algorithmically) recovered from the logical block address extremely quickly and efficiently, avoiding altogether the generally enormous translation data storage (e.g., trie structures and the like) and extensive translation times required for FTL operating modes or implementations. Moreover, the very presence of the sub-address values within the logical block address (i.e., the logical block address may be viewed as a tuple of the hierarchical sub-address values made possible by the pseudo-physical specification of the block device and in which the sub-address values that form the tuple may be re-ordered in a variety of ways and even fragmented in accordance with the user-specified address space layout for a block device or subspace therein) effects an assurance to the host that LBAs containing the same sub-addresses down to a given hierarchical level will resolve to the same physical resource. For example, LBAs containing the same channel sub-address are ensured to access a die on the sub-address-identified channel. Similarly, LBAs containing the same channel and die sub-addresses are ensured to access an erase unit within the same die, and so forth. Moreover, any of the sub-addresses may be encoded into the LBA as a virtual address—that is a sub-address value that virtualizes the corresponding (and compartmentalized) physical resource. Thus, even though a given LBA may be assured to resolve to a desired die (virtual or physical), a virtualized erase-unit sub-address enables the underlying physical resources within that die to be swapped in and out of service as necessary, all without impacting the linear address space and performance perceived by the host.

Also note that the depicted architecture permits address translation to be reduced to relatively simple operations that can be implemented using logic gates and lookup tables, that is, in a manner that can be performed extremely fast, e.g., on an intra-cycle basis (i.e., in less than a clock cycle) or at most using only a handful of clock cycles. For example, as will be discussed below, a memory controller can offload address translation to a set of logic gates and prepopulated lookup tables, which can perform address translation without requiring processor clock cycles. On-board logic can then update the lookup tables and/or metadata as appropriate, in a manner that does not encumber I/O latency. By contradistinction, conventional flash memory tables which map a logical page address to potentially any wordline in flash memory device typically require gigabit-size translation tables, with translation only being performed using a substantial number of processor cycles. This architecture, once again, helps streamline I/O latency, rendering it far more predictable, and reduces address translation time to a negligible quantity.

As discussed above, the exemplary ASL bit-field maps shown in FIG. 3D for the different block devices assume a power-of-two quantity of physical resources at each hierarchical level in the flash. In the more general case, the resources at any or all physical levels may not be power-of-two quantities and thus complicate the picture of sub-address encoding. For example, assuming a 3-channel, 5-die block device allocation in which each die contains 2000 pseudo-physical erase units and 400 pages per erase unit, the total LBA range (assuming four LBAs per page) will span from 0 to 3*5*2000*400*4 (where '*' denotes multiplication) and thus from 0 to 48,000,000−1 and thus only part of the range represented by the smallest sufficient binary address size 2^26. Moreover, because each element of the tuple that constitutes a given logical block address ranges between 0 and a non-power-of-2 maximum (i.e., magnitude of individual tuple elements are not, in all cases, power of 2 numbers), the sub-addresses of different hierarchical groups of structures (i.e., channels, dies, erase units, pages, etc.) do not fall within discrete bit fields. Said another way, the power-of-two ASL examples shown in FIG. 3D are a special case of a more general solution in which sub-address fields are recovered using modulo arithmetic that reflects the tuple composition of the logical block address. Once again, as depicted, such an architecture can be easily implemented entirely or primarily in hardware, thus reducing translation times to negligible levels.

Figure 3E:
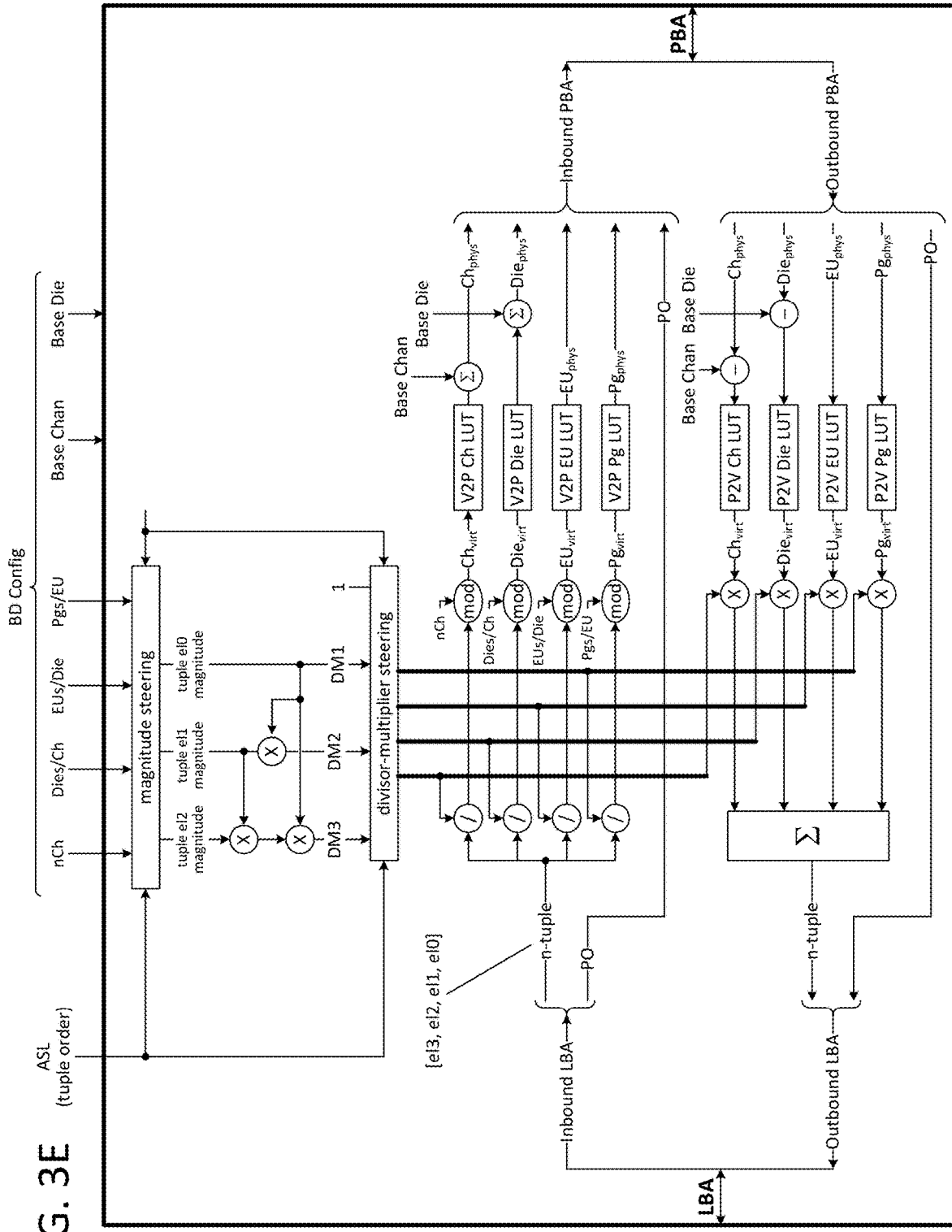
FIG. 3E illustrates a conceptual implementation of an address generation module.

FIG. 3E illustrates a conceptual implementation of an address generation module that may be used to extract (or recover) sub-address values from an inbound LBA regardless of whether the magnitude of individual tuple elements (i.e., number of channels, number of dies/channel, number of erase units/die, number of pages/erase unit) are power-of-two numbers or not. As in FIG. 3D, any or all of the hierarchical sub-address values, once recovered, may be converted from virtual to physical sub-addresses to collectively form an inbound physical block address (PBA), adding offsets to reflect the base channel and base die of the block device. For reasons discussed in further detail below, the address generator is implemented bi-directionally. That is, essentially the same operations executed to yield a PBA from an inbound LBA may be executed in reverse to produce an outbound LBA from a physical block address, thus enabling status regarding a given physical resource within the flash device to be reported to the host in terms of the LBA mapping that the host understands. Note that this information can be used to provide context to a host in order for a host to schedule maintenance or data movement (e.g., data migration or garbage collection) to preselected locations (e.g., where the logical address locations corresponding to the data are matched to the wear of a destination physical location, or where logical address locations having similar age, write frequency and/or read frequency characteristics are grouped together).

Referring first to the inbound LBA path, an ASL value (e.g., generated per the ASL lookup table entry as discussed in reference to FIG. 3D) that describes the order of tuple elements within the inbound LBA is supplied to a pair of steering circuits that yield a set of divisors—products of individual tuple elements. More specifically, a magnitude steering circuit selects, as magnitudes of the three least significant tuple elements within the inbound LBA (a four-tuple LBA is assumed in this example, having as tuple elements, a channel sub-address, die sub-address erase-unit sub-address, and page sub-address in any order), from among the block device configuration settings for structural element quantities (i.e, number of allocated channels, number of allocated dies, number of allocated erase units, number of allocated pages) to produce divisor values that reflect strides within the LBA (after scaling to account for the page offset—the "scaled LBA" or "offset-scaled LBA") at which boundaries between different members of the same structural group occur. Thus, in the 3-channel, 5-die, 2000 erase-unit, 400 page example above, if the tuple elements are ordered from most to least significant as channel sub-address, die sub-address, erase-unit sub-address, page sub-address, then the tuple element magnitudes will be 400, 2000, and 5, for elements 0, 1 and 2, respectively. Accordingly, the divisors supplied to the divisor steering logic will be DM1=200, DM2=400*2000=800,000 and DM3=400*2000*5=4,000,000. The divisor steering logic serves to route the divisors to the appropriate sub-address generation paths according to the tuple order specified in the ASL value and thus, continuing with the 3 channel, 5 die, 2000 erase unit, 400 page example (i.e., in tuple notation: "(3,5, 2000, 400)"), the channel sub-address path will receive the 400*2000*5 divisor (reflecting that a different channel is specified at each 4,000,000 increment in the scaled LBA), the die sub-address path will receive the 400*2000 divisor (reflecting that a different die is specified at each 800,000 increment in the scaled LBA) and the erase-unit sub-address path will receive the 400 divisor (reflecting that a different erase unit is specified at each 400 increment in the scaled LBA). The sub-address path for the least significant tuple element will receive a unity divisor (i.e., '1'), reflecting that a different page is specified at each increment of the scaled LBA.

Still referring to the inbound LBA path of FIG. 3E, after divisors have been applied to the scaled LBA (i.e., integer division as reflected by the '/' operator in divider logic elements), the results (integer-valued quotients) are subject to modulo operations (i.e., modulo 400, 2000, 5 and 3 for the respective sub-addresses) within the "mod" logic elements to yield sub-address values which, in the example shown, are assumed to be virtual sub-address values. As shown, the virtual sub-addresses are supplied to respective (or joint) lookup/translation modules to generate physical sub-address counterparts generally as described above in reference to FIG. 3D. Any or all of the modulo logic outputs may be physical sub-address values in alternative embodiments.

Still referring to FIG. 3E, the outbound PBA/LBA path is essentially the reverse of the inbound path, converting physical sub-address into virtual sub-addresses as necessary, multiplying by the steered divisor value (now a multiplier and hence a "divisor-multiplier"), and then summing the multiplied sub-address values to form the four-tuple LBA output (merging in the page offset to yield the full-range rather than offset-scaled LBA).

Figure 3F:
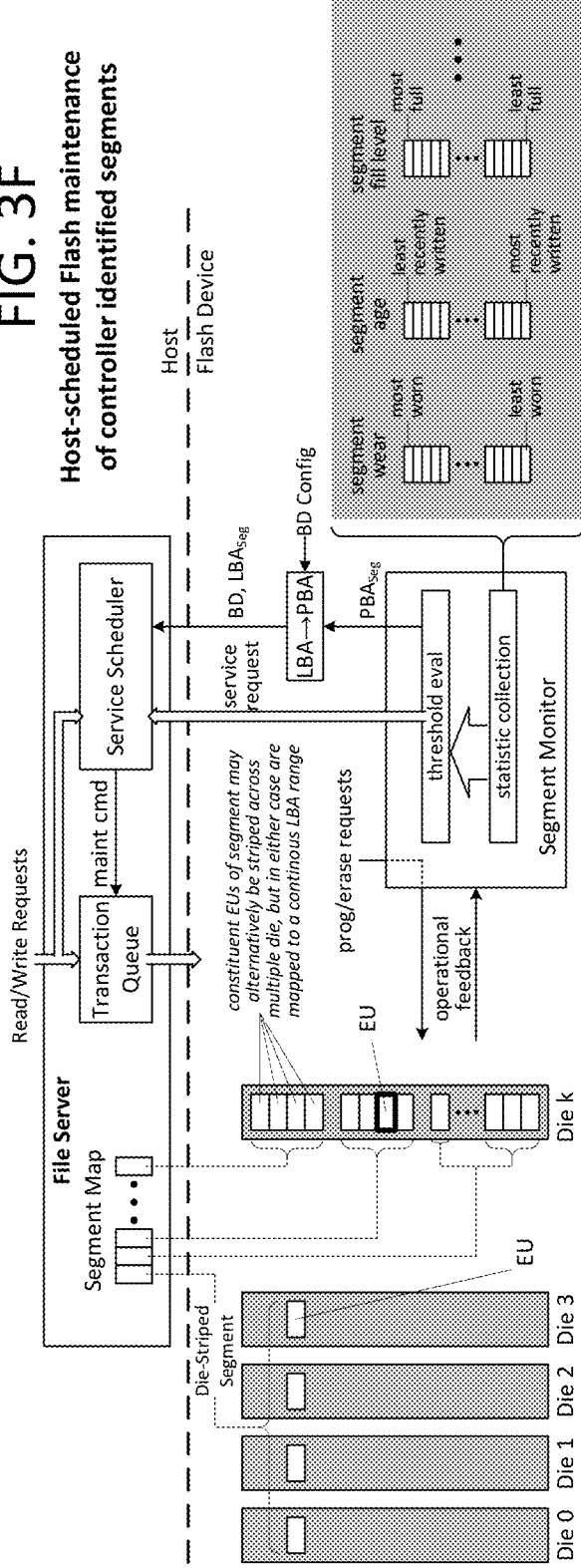
FIG. 3F demonstrates an exemplary sequence of operations coordinated between a pseudo-expositive flash memory controller and a host file server.

FIG. 3F demonstrates an exemplary sequence of operations coordinated between the pseudo-expositive flash memory controller and host file server to enable host-scheduled maintenance of flash-device-identified units of data, and more specifically segments in this example. The device tracks statistics and environmental status of the memory looking for indications that a portion of the data needs maintenance driven by a physical resource. An example of a maintenance operation might be that data has resided on a given EU for a time long enough to approach a maximum estimated safe retention time. An event could be set to trigger at a threshold of safety previously selected by the host and communicated to the device. Once that event has been triggered, the device translates the physical location though the previous block device and ASL map structures in order to identify the segment as a host LBA in which the physical resource resides. When the host has received the notification of the event, along with the associated segment LBA address, length, and event type, the host may elect to handle that event in a number of ways. Host issued instructions may garbage collect, copy, move, or discard data in a manner that best benefits the overall efficiency of the system. Those instructions may be mixed into the overall system scheduling. Note that in contradistinction to conventional approaches (e.g., where an entire address space is garbage collected, in a device-wide operation delegated to a memory controller) that this approach permits the host to command specific maintenance operations to specific hierarchies, for example, by command to perform maintenance on a specific EU; to this effect, the host transmits a maintenance command with a specific block address, which the memory controller uses to perform maintenance on a host-selected or host-specified address range, conveyed by or in connection with the maintenance command. Once data has been relocated or discarded, a segment of interest may be erased.

In opportunistic single-plane mode, the flash die is generally accessed one erase-unit at a time (or more accurately one page within one erase unit at a time, for reads and writes), occasionally executing a dual-plane command where a pair of successive accesses are directed respectively to erase units within the odd and even planes. By contrast, when configured for dual plane mode, each host requested memory access is translated by the memory controller into a dual plane command sequence that accesses a matched pair of erase units within each of the odd and even planes (i.e., one odd-plane erase unit and a counterpart even-plane erase unit). Accordingly, the page registers and erase units are viewed, from a pseudo-physical perspective, as double-width elements as compared to individual page registers and erase units in single-plane mode. Moreover, the total number of erase units is halved (by the effective merging of the two planes) so that the pseudo physical address range is reconfigured to account for half the number of virtually addressable erase units within the die, and double the number of logical blocks per page.

Figure 3G:
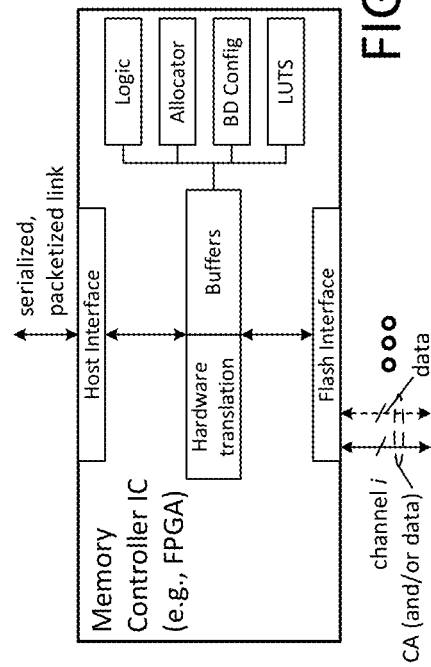
FIG. 3G illustrates a memory controller integrated circuit ("IC").

FIG. 3G illustrates the pseudo-expositive memory controller just discussed, implemented as a memory controller integrated circuit (IC). As noted by the figure, in one version, such an IC can be implemented as a field-programmable gate array (FPGA) having logic gates and lookup tables (e.g., circuitry) configured to provide fast address translation as discussed above; this is not required for all embodiments, and in other contemplated embodiments, a memory controller can be implemented as a special purpose processor or other preconfigured integrated circuit, with or without the use of support software (e.g., firmware). As depicted by the figure, the IC includes a host interface, which for example, uses a standard communication interface framework (e.g., non-volatile memory express, or NVME or Serial ATA) for packetized communications, where packets comprise commands, address and data, as appropriate; note that this interface can be shared for commands directed to different channels or devices, i.e., the commands and data to respective channels and/or dies are typically MUX'ed over this channel for exchange between the memory controller IC and the host. Similarly, as discussed earlier, the memory controller features a flash interface, whereby one or more channels are used to communication with one or more memory devices. Each channel can consist of a set of links for address and/or data (e.g., for packetized communication of address and data over a set of eight links), or can feature separated address and data busses (as depicted by the optional, dashed-line links designated for "data"). The memory controller IC also features hardware translation circuitry as mentioned (e.g., with ASL parameters being used to configure address wrapping and distinction between hierarchical levels and with LUTs used for address mapping at selected or predetermined levels of the hierarchy) and buffers for buffering commands and/or data transfer as appropriate. In addition, the memory controller IC in this embodiment can include supervisory logic (e.g., for responding to host queries, performing LUT updates, and configuring parameters as appropriate, as well as for controlling sequencing and maintenance operations in memory), a block-device designer and allocator section as discussed earlier in connection with FIG. 3A, and block device configuration elements, as appropriate. In one embodiment, some or all of these functions can be implemented in the form of instructions stored on non-transitory machine-readable media (e.g., firmware or software, for controlling one or more cores or processors).

Having discussed the structure of a pseudo-expositive memory controller, various techniques will now be discussed for optionally using such a memory controller to handle delegated processing functions, as introduced earlier.

Figure 4A:
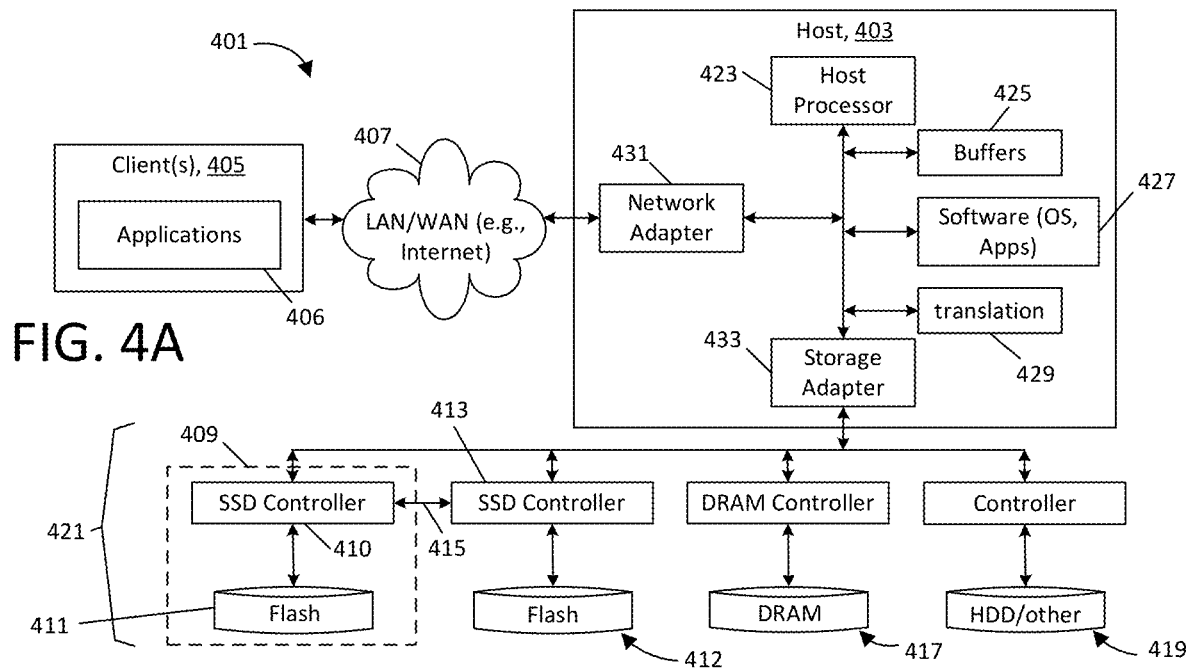
FIG. 4A illustrates a block diagram of a storage server having multiple solid state drives (SSDs) and other drives, such as hard disk drive ("HDD").

FIG. 4A illustrates an exemplary system 401. In particular, a storage server 403 receives requests for data or to store data, and optionally, requests for processing that data from one or more clients 405. These clients each have respective applications 406 which generate the respective data-related needs. The clients can each be desktop or laptop computers, smart phones, pads or other devices, or other types of digital systems. Each client 405 sends requests to the storage server 401 and receives responses via a wide area network, e.g., a local area network (LAN) or a wide area network (WAN) such as the Internet. The storage server, in turn, manages plural drives, each of which can be an SSD (e.g., a flash based drive), a HDD or another type of drive. As seen in FIG. 4A, each drive also has its own dedicated memory controller (e.g., a cooperative memory controller and/or pseudo-expositive memory controller), either bundled together as a single assembly or drive 409, or as separate devices; for example, drive 409 is seen to include a SSD controller 410 and a flash memory 411. To simplify FIG. 4A, a dashed-line box is shown only for assembly 409. The SSD controller 410 can be a NAND flash memory controller and the flash memory 411 can have one or more NAND flash memory devices. FIG. 4A also shows optional presence of other independent drives, 412, 417 and 419, in this case seen to include a second SSD, a DRAM device of some sort, and an HDD or other type of memory, respectively. Arrows 415 indicate that, if desired, memory controllers 410 and 413 for the respective SSDs can be configured for peer-to-peer access (or direct memory access by the memory controller for one drive to the memory of another drive, with one controller acting as a master and the other controller acting as a slave); for example, as depicted, memory controllers 410 and 413 each manage flash memory and can be provided with VBD/ASL information for memory of the other drive, with each flash memory device (e.g., 411) having multiple interface ports and an arbitration mechanism for locking a VBD being accessed by one memory controller against concurrent access by the other controller. The arbitration mechanism is optionally structured so as to permit an accessing controller to update stored state information of a slave memory controller so that the slave memory controller will see correct (i.e., updated) metadata for each managed memory location upon renewed access to its managed memory. Each drive, such as SSD 409, is seamlessly managed as a storage aggregate 421, with the storage server managing scheduling for all drives so as to avoid collisions with storage-server-directed reads and writes, as described earlier. In this regard, the storage aggregate and the host are bundled together to form the storage server, but this is not required for all embodiments. The storage server has a storage operating system that implements a file system to organize the stored data as a hierarchical structure of logical data containers (e.g., volumes, logical units, directories and/or files) on electronic and/or magnetic storage media. It will be understood by those skilled in the art that this description may apply to any type of special-purpose computer (e.g., file server or storage serving appliance) or general-purpose computer embodied as, or having, a storage server or portion thereof. Moreover, the teachings of this description can be adapted to a variety of storage server architectures including, but not limited to, a network-attached storage (NAS), storage area network (SAN), or a disk assembly directly-attached to a client or host computer. The term "storage server" should therefore be taken broadly to include such arrangements.

The storage server 403 includes a host processor 423, which uses various buffers 425 under the auspices of the host software 427 to schedule and manage memory operations, including both memory transactions and memory maintenance operations. The host maintains a local translation table (e.g., virtual address translation table) 429 so as to access files which can be fragmented in multiple memory locations and potentially multiple drives. The storage server also optionally employs policy-based space allocation, supporting data- and media-characteristic-aware data placement across the entire storage aggregate 421. The storage server communicates with the clients 405 via a network adapter 431 and with the storage aggregate 421 via a storage adapter 433 (although it is also possible to have all communications performed via network adapter or otherwise remotely over a network such as a WAN or LAN).

In some implementations, the client(s) can issue packets including file-based access protocols such as the Common Internet File System (CIFS) protocol or Network File System (NFS) protocol over TCP/IP when accessing information in the form of files. In other implementations, the client(s) can issue packets including block-based access protocols such as the Small Computer Systems Interface (SCSI) protocol encapsulated over TCP (iSCSI) and SCSI encapsulated over FC (FCP) when accessing information in the form of LUNs or blocks. Also in some implementations, the storage adapter includes input/output (IO) interface circuitry that couples to SSDs (409 and 415) and HDD (417) over an IO interconnect arrangement, such as a conventional high-performance Fibre Channel serial link topology.

The storage server manages flash memory using a log-structured copy-on-write file system, in a manner that obviates need for an extensive FTL layer on the side of the SSD and that better distributes wear). The storage server is configured to access NAND flash memory, such as in drives 409 and 415. using logical block addressing, and to account for NAND flash memory-based device wear-out, and to execute garbage collection with associated valid data migration to manage NAND flash P/E asymmetry and other NAND flash management functions, all as referenced earlier, and offloaded processing functions, as appropriate. This is to say, each flash-based drive such as assemblies 409 and 415 advantageously have a cooperative or pseudo-expositive memory controller that implements the principles described earlier. Depending on system architecture, host software manages interaction with each such controller. This architecture provides for host-memory-controller cooperation in managing NAND flash memory-based storage devices in direct-attached and/or network-attached storage environments. For example, each flash-based drive has a respective controller that serves information to the host regarding each subdivision of the associated memory. The storage server (in this case, the host) can manage wear distribution across multiple drives to help lessen wear to any one area of memory; for example, in the context of the wear-aware writes, the storage server can collect wear metrics for all flash memory managed as well as for other types of nonvolatile memory, if present. The storage server can combine bitmaps from multiple drives and can allocate if desired new writes to a single drive only if needed to better distribute wear. As mentioned, the host can also electively direct writes of data based on policy, for example, in a manner that avoids fragmentation or that groups certain types of data together based on read-write characteristics. In one embodiment, each SSD memory controller (such as controller 411) is rooted in a configurable architecture that depends on host capabilities, policy, or other considerations. For example, in such an architecture, if the host processor does not support host-assignment of physical addresses for new writes, the host configures each SSD memory controller to perform this function and to report back assigned physical addresses as described earlier.

Figure 4B:
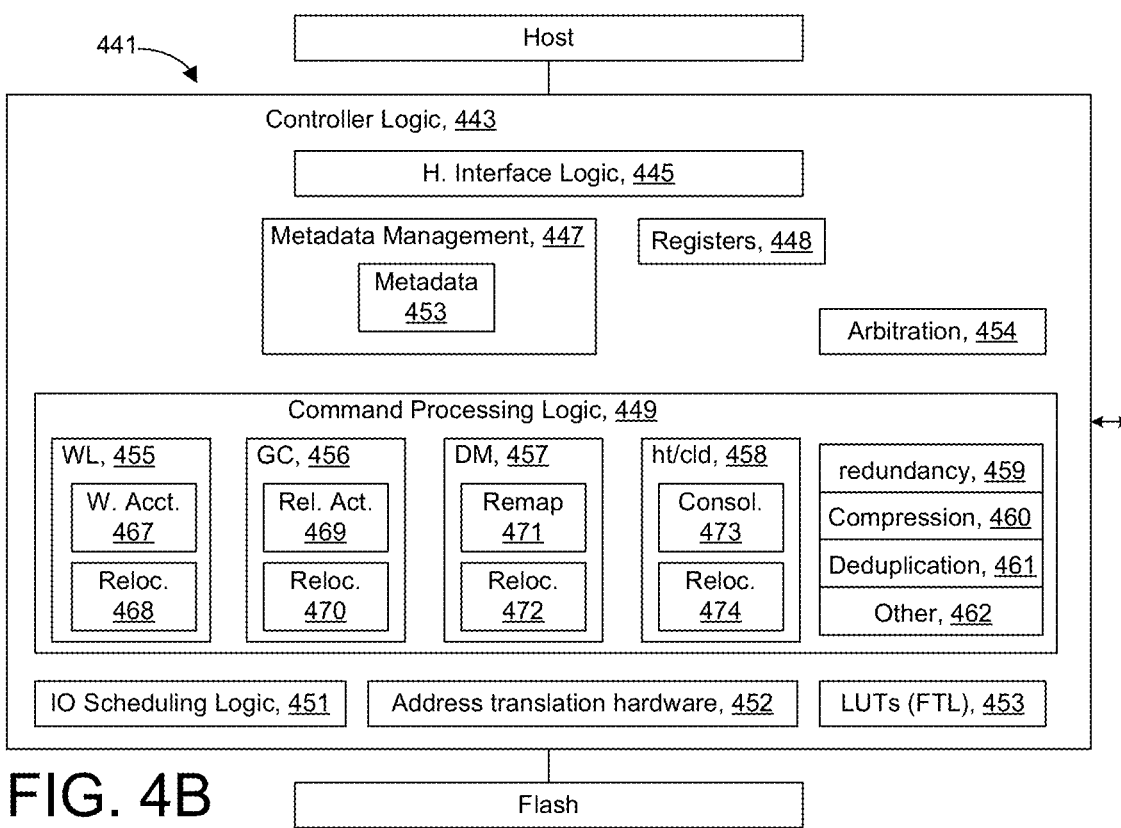
FIG. 4B is a block diagram of memory controller logic used in supporting cooperative functions.

FIG. 4B shows a block diagram of a flash memory controller 441, for example, used as controller 409 and/or 413 from FIG. 4A; more particularly, FIG. 4B is used to show how logic functions can be implemented using hardware and firmware logic 443. This logic 443 supports a number of optional processing features. In one embodiment, this memory controller uses this logic to perform many traditional flash controller functions (e.g., management of an FTL and associated search trees). This is to say, while one advantage of the memory controller 441 is the substantial reduction of FTL layer functions, this is not required for all embodiments. In another embodiment, the memory controller implements comprehensive cooperative functions that help reduce the need for complex FTL processes, as referenced above. In each embodiment, the memory controller 441 maintains hierarchy-specific information for all units of memory governed by that memory controller.

For the embodiment of FIG. 4B, logic 443 is seen to have a number of basic function blocks, including interface logic 445 to interact with the host using packetized commands and responses, logic 447 used for local metadata management, registers 448 for storing ASL tables and FTL information and other operational parameters, command processing logic 449 used for query processing and other management functions, IO scheduling logic 451 used to manage memory transactions (e.g., program and erase operations) and arbitration logic 454 (e.g., where the memory controller is configured for peer-to-peer operation as introduced earlier). As noted, even in an embodiment where it is desired to substantially reduce the FTL layer, a memory controller can still optionally implement some address translation, for example, implementing per-die FTLs that accommodate defect management functions. This will be described below. The metadata management logic 447 maintains locally-stored information in the form of metadata 453, as mentioned, for each unit of memory of the memory device. This information can include back references mappings for each memory unit; that is, as discussed below, a scheme of shared address assignment responsibility can be implemented, with the memory controller assigning physical addresses based on an initial logical address specified by the host, with the memory controller reporting back assigned back references and/or redirection to the host, for the host to update its references for future reads to the data. The memory controller as discussed above can use address translation hardware (452), predicted on customizable parameters (e.g., with a modulo operation being applied through multiple levels of the memory's structural hierarchy), and can also build FTL tables as necessary and store these in internal memory, per numeral 453. The FTL tables can be built in a manner dedicated to each resolved unit address for a given level of the structural hierarchy (e.g., each die), and updated for certain maintenance function, such as data relocation, unit erase, garbage collection, defect management and other functions.

To provide another example of use of a limited address translation scheme, the memory controller can be configured to identify write error and to transparently remap the subject data over to reserved memory space. Because such reassignment might affect only a very small portion of data written to memory, the memory controller can advantageously keep track of this reassignment using either the pertinent FTL table or metadata 453, depending on embodiment. For example, future reads specifying the remapped EU are intercepted by the memory controller logic using locally-stored metadata 453 and redirected to the proper physical location in memory for defective blocks. In this manner, the memory controller is freed from having to implement extensive search trees to find physical locations based on supplied logical addresses, i.e., the memory controller need only maintain a per-die FTL (or FTL for other unit in the memory's structural hierarchy) and track defective memory reassignments, which ultimately become stale as the memory controller progresses through erase operations, garbage collection and updates of data (the latter being directly written to new pages or EUs). Note that such address translation can be kept very simple if memory controller simply allocates remapped space to a reserved EU using a like page assignment, or conversely, remaps a first physical page in a given EU to another physical page in the same EU.

The command processing logic 449 receives commands from the host directed to general configuration of memory operations and for queries. Generally speaking, this logic manages and updates the metadata 453 and runs queries on the metadata, returning information to the host as appropriate via the host interface logic 445. The returns to the host can be immediate returns to synchronous commands and immediate or later responses (or alerts) to asynchronous commands. Exemplifying some command options, the command logic can (a) serve information up to the host drawn from metadata 453 for use in wear aware writes, and (b) assist with wear leveling (WL), garbage collection (GC), defect management (DM), hot/cold management, redundancy, compression, deduplication or other functions in memory.

An exemplary memory controller can assume varying levels of host support in a manner that can be customized to any specific memory system design. That is, memory controller 441 possesses dedicated logic infrastructure to perform WL, GC, DM and hold/cold specific functions (455, 456, 457 and 458, respectively), each of which can be tailored to a specific level of interaction with the host pertinent to the specific implementation. Similarly, the memory controller 441 also possesses logic as appropriate to perform offloaded functions such as Erasure Coding or ECC management using logic 459, and Compression, Deduplication and/or other functions using logic 460, 461 or 462, as appropriate. Depending on the desired level of interaction, the memory controller 441 helps avoid the need for remote storage and retrieval of large address translation tables and the use of complex search trees, e.g., address translation can be performed using a greatly simplified address translation table or omitted in the memory controller entirely. In addition, the configured level of cooperation can advantageously permit a host to directly assume scheduling of many flash management functions that might interfere with (i.e., compete with) host-directed writes, such as garbage collection, data relocation, wear leveling and so forth. That is to say, an architecture will be described below that permits a memory controller to serve sophisticated information to the host to assist with this scheduling. This, combined with less FTL overhead, provides for faster, more consistent flash response, and facilitates multiple drive storage aggregates based on solid state (flash) drives (SSDs) as well as mixed or heterogeneous systems that combine SSDs with other memory types.

Note that this is an example only, e.g., the architecture described herein can optionally also support a traditional FTL design, or memory controller management of complex functions.

To assist with host scheduling of flash management tasks, the memory controller can have firmware or hardware logic (or both) dedicated to specific types of host commands and host queries. In the embodiment of FIG. 4B, this structure is illustrated as optionally including structure to assist with wear leveling (WL), garbage collection (GC), defect management (DM), hot/cold data relocation, redundancy management, Compression, Deduplication, and other functions, but other functions or logic can also or instead be used. To support these functions, the memory controller uses command processing logic 449 to manage space allocation and space reclamation, and otherwise to service host calls for the return of management data. For example, this command processing logic can facilitate direct physical addressing by identifying for the host available (i.e., available, erased) address space, candidates for erase (released space), candidates for data relocation and garbage collection (e.g., based on low page utilization), assistance with cold data location (e.g., wear leveling), or more general functions.

For both embodiments that use wear-aware writes as well as those that do not, the memory controller can include wear leveling logic 467. That is, to account for a limited number of flash memory P/E cycles (typically on the order of tens to hundreds of thousands of cycles for NAND flash), the logic on board the memory controller can be designed to track wear as part of metadata 453 and to provide this information to the host. If over time, certain units of memory are determined to represent disproportionately high or low wear relative to overall memory, wear leveling can then be performed. Note that for embodiments where wear-aware writes are used, wear leveling can be highly localized, i.e., performed as a data relocation option simply to redistribute cold data. The memory controller 441 can generate alerts when predetermined wear thresholds are reached, and can otherwise perform low level queries relating to wear leveling. In support of the techniques presented by this disclosure, the wear accounting logic 467 can keep a changing-list of EUs, ranked in order of coldest data, least wear, greatest wear or in another manner. In one embodiment, this logic can be prompted via an explicit host command to synchronously compile such a list or to asynchronously notify the host of EU identity any time a wear metric (e.g., EU erase count) exceeds a programmably-defined value. Then, when and as wear leveling is scheduled by the host, the host issues a command to the memory controller to relocate cold data and erase the old space (e.g., using relocation logic 468), thereby redistributing that space into a pool of available space used for active writes (and potentially more frequently-cycled data). Note that in an embodiment where the host directly addresses physical space and performs wear-aware address assignment, distribution of wear can be inherently minimized as part of the write process. However, disproportionate wear can still occur for data that is held for a long time and which is therefore deemed "cold;" that is, cold data can keep EUs out of circulation while other EUs are more frequently recycled. The memory controller architecture presented by this disclosure supports memory controller cooperation with wear management through the use of "limited" data relocation and wear leveling processes (e.g., directed only to specific address ranges within flash) as well as (if pertinent to the implementation), the scheduling and management of more extensive wear leveling, e.g., for entire flash devices or across multiple flash devices or drives.

A copy-on-write process can result in retaining old pages in flash memory that are stale. This is because a given EU can have other pages that are still in use, and the old page location typically cannot be reused until the entire associated EU is recycled. Over time, substantial portions of flash memory can be locked up simply because a small fraction of space in many respective EUs is still in use. This situation can occur whether the host or the memory controller performs address translation. To address this, the memory controller of FIG. 4B therefore uses garbage collection logic 456 to assist with functions of periodically consolidating data. That is, the garbage collection logic can track information pertinent to whether an EU is mostly stale or is still efficiently being used and can process host queries relating to this information. One form of this tracked information is page utilization information, e.g., where the memory controller stores information indicating whether each page in a given EU is available (erased but not yet written), has valid data (cannot be written to without an erase), or is released (a page with stale data that cannot be rewritten until it is first erased). Garbage collection involves accounting for released pages, for example, using release accounting logic 469 to track the mentioned page utilization information for each page (or other logical unit) for each EU; EUs with relatively few used pages can have those pages consolidated with pages from other EUs having similarly low page utilization, with the then-concentrated valid date being rewritten to a new destination. In an embodiment where the memory controller tracks this information, the memory controller can compute an extent of page utilization (e.g., 10% valid data) and can provide this information to a host with EU identity to permit the host to decide which EUs should have data consolidated and moved. The host can then schedule any resultant operation in a manner that does not compete for needed read data elsewhere in the subject memory. Note that "page utilization" as used herein generally refers to the extent to which pages of a given EU are valid (in use) or are stale or not in use. For example, if most pages in a given EU were stale or unused and only a few pages of the EU had valid data, the extent of page utilization in the given EU would be low. Conversely, if most pages in an EU were in active use, the extent of page utilization for the given EU would be high.

In an embodiment where the host cooperates with the garbage collection task, the host can query the memory controller using a command, with processing of the command performed in cooperation with the release accounting logic 469. In more detailed embodiments, the release accounting logic can be designed to perform low level inquiries, for example, to return a list of EUs where page utilization falls below a specific threshold (e.g., 50%). This type of function can also be managed as an asynchronous task, e.g., the host can request that the memory controller alert the host if at any time an EU that has been written-to (or that has just had a page released) experiences less than a threshold level of page utilization; in this regard, the release accounting logic 469 tracks explicit page release with each command information update, and can perform any processing necessary to alert the host in response to any asynchronous queries. The release accounting logic 469 also has circuitry and/or firmware that performs other forms of processing, for example, optionally providing a list of "the 10 best" candidates for garbage collection in order of page (under)utilization. In another embodiment, some or all of the data relocation functions can be managed by the memory controller, for example, with relocation logic 470 being delegated specific tasks by the host (such as the identification of EUs to the host for relocation of data, or relocation of data in response to a host-specified target memory address). Once relocation has been performed, with respective metadata updated and associated physical pages are released, the full EU is reclaimable. In one embodiment, this is performed by the host, which issues an explicit Erase-Block command for an address-specified EU—logic 449 processes this command and, once the command is completed, returns the freed EU to a pool of available EUs for future data allocation.

Write and erase errors discovered by the flash memory controller are handled by defect management flash management logic 457. Pages found defective due to write error are remapped by defect remapping logic 471, with write operation retried transparent to the host. The original page in error is marked defective or "bad" and added to a bad block list or map to avoid further use of associated physical pages. Unit relocation logic 472 performs background relocation of data that experienced write error to minimize possibility of further write errors. Unit erase errors are handled by the defect management logic as well, with defective EUs also reflected on a bad block list kept by the flash memory controller. As indicated, in such a scheme, the entire EU can optionally be moved, preserving relative page layout and simplifying translation issues.

Hot/cold data management can be performed by tracking data-specific metadata for the various structural elements of memory; ostensibly a form of wear leveling, in one embodiment, the memory controller optionally uses processes that periodically look for "old" data (that is, data that has not been written for a long time, or that alternatively has a low read frequency), and remaps that data to a different memory location to effectively help distribute lifetime degrading memory rewrites throughout memory managed by the memory controller (or throughout a particular VBD), using processes similar to those described earlier; for example, the memory controller sends a notification to the host, which the host then uses to schedule a data move, and then—at the scheduled time—commands the memory controller to move the data from LBA x to LBA y, optionally all without the data ever having been sent to the host. Consolidation logic 473 can identify hot data, cold data, or other information (e.g., EUs having disparate hot/cold data characteristics), with relocation logic 474 being used to respond to host commands and update stored metadata (in the manner previously described).

As operations are performed in memory, whether as part of a management operation (such as data relocation) or in servicing a write or read command, IO scheduling logic 451 detects completion of the command. Pertinent information is added by metadata management logic 447 to the stored metadata 453 for the pertinent EU, and the host is then signaled with any completion codes as necessary. For example, if a data relocation operation has been performed, the metadata 453 can be updated with new information for both source and target blocks of memory.

Note that, depending on embodiment, the flash memory controller can support one or more of the functions or units of logic described above, i.e., a memory controller can include subsets of the described logic to assist in the performance of specific tasks. For example, one hypothetical memory controller could omit the data relocation logic 468 if the host was to perform this function. Also, other logic functions can also be supported or provided for beyond those discussed. As mentioned, the embodiment of FIG. 4B presents a single memory controller architecture adaptable to multiple, different implementations, but this is not required for all embodiments.

FIGS. 5A-5F provide additional detail regarding various ways of managing offloaded processing functions using such a cooperative (e.g., pseudo-expositive) memory controller.

FIG. 5A provides another view of an exemplary ASL look-up table, similar to the one discussed above in connection with FIG. 3A. However, the right side of the table further includes an entry for Erasure Coding/ECC, which specifies an algorithm of "x" and a destination of "y." The algorithm in this instance specifies the Erasure Coding or error correction algorithm to be used (e.g., a specific CRC algorithm) applicable to the specified VBD; note that while one VBD is indicated, the ASL LUT advantageously includes a similar entry for each VBD, permitting designation of a different Erasure Coding/ECC process per block device. That is to say, the ASL LUT structure permits a different redundancy process to be specified per block device or none at all. The specified destination, y, identifies to the memory controller where the redundancy information is to be stored, potentially including a host-visible or reserved storage location in the same VBD, a different VBD, or potentially storage in a different drive (e.g., using the arbitration and peer-to-peer structure referenced above). Using such a structure, a pseudo-expositive memory controller can be configured to deterministically store redundancy information in a manner configured by the host (e.g., with or without use of an explicit "commit" command as referenced earlier; because the host has visibility into memory allocation (i.e., VBD definition) beneath such a memory controller, it can schedule and manage parallel concurrent operations in respective structures, managed as independent units, free from the constraints imposed by memory device write latencies. Note also that the ASL table can store pertinent, per-block device information for other offloaded functions; for example, the depicted fields (algorithm/destination) can also be used to specify a Compression (compression/decompression) algorithm or mode, a Deduplication algorithm or mode, or specifics for other types of offloaded functions, and a stored write parameter (e.g., an internal destination, such as RAM, external storage destination, etc.) for the result of processing if desired.

FIG. 5B illustrates an architecture where the memory controller reserves two different types of spare structural elements (e.g., EUs within a given memory die). More specifically, as alluded to earlier, the memory controller can perform defect management, by monitoring memory performance to detect errors and by swapping reserved spare structural elements in for structural elements that experience error; note that this process can be performed for any structural element in the memory hierarchy, for example, for VBDs, channels, dies, banks, arrays, planes, EUs and/or pages. In this particular example, it should be assumed that the spare units are either EUs or dies; as noted earlier, however, spare units (and the use of LUTs to remap LBAs or to swap out structural elements) can be maintained for any level of the memory hierarchy, as pertinent to the system design. Certain ones of these elements are host-visible, e.g., the memory controller advertises to the host that the depicted memory space is one EU/die wide by two deep. FIG. 5B depicts that, transparently, the memory controller reserves two structural elements, one of which (no. 3) is seen as reserved for redundancy information (e.g., Erasure Coding and/or ECC data) and one of which (no. 4) is to be used as a spare for swapping in in the even that one of the host-visible structural units (e.g., nos. 1 or 2) is determined to be defective. Note that it is not required for all embodiments that the reserved space used for redundancy information be transparent to the host, i.e., in one embodiment, this reserved space is transparent to the host (e.g., the memory controller is configured transparently stores ECC information for data written into units 1 or 2 into unit no. 3); in another embodiment, this memory space is visible to the host, e.g., it represents a demarcation used to store redundancy information for the same or a different block device.

FIG. 5C illustrates an architecture where redundancy information is stored in a different block device and associated effects on memory system throughput. More specifically, FIG. 5C depicts three block devices, BD0, BD1 and BD2. It is assumed for purposes of this FIG. that a memory controller is a pseudo-expositive memory controller and that the host is aware of the demarcation between the various block devices. In this case, it is assumed that (as referenced by numeral 503), the host writes data into block device 0 ("BD0") and has configured the memory controller to then write some type of data into block device 1 ("BD1"). This data could be Erasure Coding information, ECC data or other redundancy information, for example, written per numeral 505 responsive to a commit command as introduced earlier. It could also be that the data is the result of a compression operation, i.e., the host attempts to write data having a relatively long data length (as represented symbolically by the depicted width of BD0), the memory controller compresses the data, and transmits information to the host (which reveals to the host that the compressed data will fit within BD1), and the host then commands the memory controller to instead write the compressed data to BD1. It could also be that the destination for the data (e.g., redundancy data) is indeterminate, and that the host could alternatively write the data into BD1 or block device 2 ("BD2") but elects to have this information written by the memory controller into BD1 because the host already has issued (or has imminently scheduled) a maintenance or data access operation in BD2. Reflecting on the depicted structure, it should be noted that (a) it permits a host to configure the memory controller to deterministically store redundancy information, in a manner where the host can concurrently access other structural elements in the memory hierarchy (i.e., notwithstanding use of a common memory controller and virtualized memory, e.g., flash, memory space beneath that controller), (b) using the optional "commit" command, it permits the host to dynamically schedule a time and/or dynamically select a destination for write of the data (e.g., per write process 505), (c) the host can select these things so as to not collide with a planned operation in BD2, (d) the write process 505 can be performed without the data (e.g., redundancy data or compressed data) ever being sent to the host (e.g., the commit command is sent without accompanying data), and (e) notwithstanding that all block devices might be composed of nonvolatile memory having long programming times, unpredictable program-verify requirements and/or program erase asymmetry, the host can interleave commands and treat each block device (BD0, BD1 and BD2) as independent units having no interdependency constraints (i.e., assuming that a command slot is available, an operation in BD2 is not affected, and has no timing requirement, relative to an ongoing or planned operation in BD0 or BD1).

FIG. 5D is used to further elaborate on peer-to-peer operations and arbitration as introduced earlier. More specifically, FIG. 5D depicts two drives, each having a controller 531/532 and respective memory 535/537 managed by that controller. As indicated further by numeral 533, each of the drives is interconnected by a peer-to-peer bus 533 to permit drives to directly transfer information as might be commanded (538) by a host. To this end, during system configuration, the host discovers/configures not only memory geometry for each drive, but it publishes to all controller (e.g., controllers 531/532) routing information usable by each controller (531/532) to directly access the other controller (532/531) via the peer-to-peer bus (533). As commanded by the host, each drive can thereafter send write data to another drive without having to pass that data through the host. As a first example, it is assumed that controller1 (531) has performed hot/cold data analysis and has determined (according to host-specified parameters/thresholds) that "hot" and "cold" data is inappropriately mixed together in a particular unit in its memory hierarchy, and it signals the host to this effect. The host then determines, based on information sent to it by controller1 (i.e., associated metadata) that the "hot" data should instead be stored in memory2 (537), which is part of a different drive and is managed by controller2 (532). The host therefore transmits a command to controller1 to transfer the "hot" data directly to controller2, via peer-to-peer bus 533. Accordingly, controller1 (531) sends a write command and write data and associated metadata via peer-to-peer bus 533 to controller2 (532); as pertinent to the embodiment, the host can relay via controller1 (531) one or more LBAs in memory2 (537) that are to receive the data, which controller2 (532) then parses to a VBD, channel, die and so forth using modulo-based addressing, as introduced above; the data is then written to (i.e., moved to) memory2 (537) as indicated by path 539, i.e., without ever being sent to the host. Controller1 (531) and controller2 (532) then update their stored metadata to reflect the transfer. In a second example, this transfer can be of redundancy information or compression data as referenced earlier; the host for example can send a commit command to controller1 (531) that specifies a different drive (i.e., managed by controller2, 532). Accordingly, when and as controller1 (531) receives this command, it draws the redundancy/compressed data out of its internal RAM and transmits the data as part of a write command via peer-to-peer bus 533 to controller2 (532), again, with a LBA specified by the host; controller2 then interprets this LBA according to its ASL table information and writes the associated data into memory. If desired, the second drive (i.e., via controller2 and connection 540) can transmit a confirmation to the host. Note that the arbitration logic in each controller (see FIG. 4B, discussed above) optionally directly provides a mechanism for avoiding competing command received via the peer-to-peer bus 533 and connection to the host (538/540); in one embodiment, this mechanism simply determines whether an addressed VBD is already busy, and if so, it queues received commands. In other embodiments, however, a busy signal can be sent to the pertinent requester and/or a "reservation" can be sent to requester, to permit the requester to resubmit the command at a later time. Once again, it should be appreciated that using such an architecture, the host can dynamically schedule a write time such that the two drives exchange data in a manner not interfering with host access requirements, and conversely, the host can schedule data accesses or maintenance operations for other drives and/or other structural elements (e.g., VBDs) for each memory controller in a manner that does not violate any memory programming time constraints associated with the flash memory. Also, note that for this example, that controller1 (e.g., a flash memory controller IC), and its redirection of write data to controller2 can in one embodiment be performed purely on the LBAs, that is, without address translation. As an example, the host in this example determines that data originally sent to (and processed by) controller1 would be better stored in another drive; it supplies a set of LBAs to controller1 where the LBAs or side data informs controller1 to send the data to controller2—in such an example, address resolution might be performed by controller2 (and not by controller1, despite the fact that controller1 manages flash memory space). Note this is not required for all embodiments.

FIG. 5E provides another FIG. used to discuss offloaded processing, including without limitation Compression processes and deduplication processes. A memory controller 541 is seen to have internal logic including command logic, processing logic, various buffers and on-board RAM, host reply logic, command abort logic and storage for metadata. The memory 543, again, which can be nonvolatile memory such as flash memory, is seen to have three data slots, including a first slot which stored data1, a second slot which stores data2, and a third, empty (i.e., shaded) slot 549. The memory controller receives various commands from the host via bus 545 and it responsively issues commands to the memory 543 via bus 547. The command logic in the memory controller 541 receives commands from the host (including maintenance and data access commands), and it effectuates those commands, exchanging data and/or metadata and other information with the host via bus 545. The processing logic performs delegated processing tasks, such as Erasure Coding, ECC computation, Compression and/or Deduplication processing, as pertinent to the embodiment, or pursuant to a mode or command. For example, if the memory controller receives a command to compress data that would nominally occupy all three depicted memory slots (if uncompressed), the processing logic performs compression and identifies that compression will reduce data size by one-third, and it uses the reply logic to inform the host of this fact. The host then can send a commit command to memory, which results in data1 and data2 being written from the buffers/RAM into memory 543 as indicated, with slot 549 remaining in unwritten state; this slot can thereafter be used by the host/memory controller for storage of other data, and the memory controller in all instances updates its stored metadata as appropriate. If the commit command specifies a different drive, the depicted abort logic aborts execution of the command within memory controller 541, with the memory controller 541 then transferring the pertinent data to a different drive, as referenced above. If the intended operation is a deduplication operation, for example, assuming that data is to be written into slot 549 and that this data duplicates data1, the processing logic compares a hash of the newly-received write data with metadata stored for data1 (i.e., which has the same hash); the processing logic detects this match and then informs the host (using the reply logic). The host then sends an abort command, which is processed within the memory controller by the depicted abort logic and which causes the memory controller 541 to discard the previous write command before execution (and to stale out the associated data); once again, the memory controller then updates pertinent metadata (e.g., back references for data1) as appropriate. As already mentioned, in an alternative architecture, a commit command can also electively be required of the host before received data is committed to memory (e.g., slot 549) from the buffers/RAM inside the memory controller. Such an architecture streamlines memory operations because, once again, the host can offload functions to the memory controller and can dynamically schedule writes or other processes, so as to not compete with host required access, on the basis of VBDs or other structural elements exposed to the host. Also, the memory controller in such an example is able to identify memory space that has not been written to, and so can interact with the host to apply this memory space to other purposes, and/or to redirect data to more other storage locations which might be more suitable (e.g., given a particular level of compression).

Figure 5F:
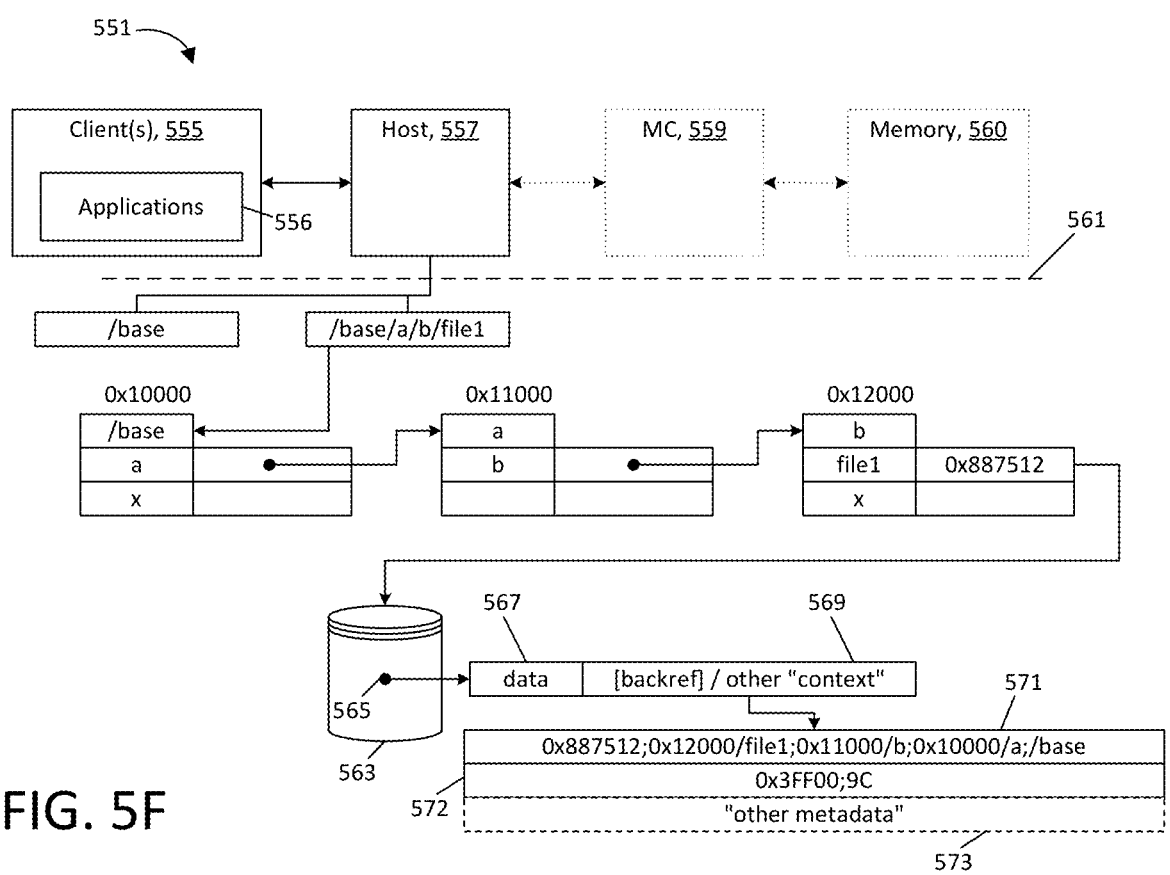
FIG. 5F is a diagram used to explain host file references and back references (which can be stored by a memory controller and provided to a host in accordance with various embodiments herein).

FIG. 5F is an illustrative diagram relating to the generation of back references that can be stored in association with writes of data into memory. More specifically, FIG. 5F illustrates an embodiment 551 having one or more clients 555, each having associated client applications 556, a host 557, at least one memory controller 559, and memory in the form of one or more arrays (560) managed by an associated controller. A horizontal separation line 561 is used to demark actions taken by the host in mapping data, for example, associated with one or more of the client applications 556, into memory 560. For this example, it should be assumed that the host is to store data as part of a file structure identified as "/base" and further that this file structure contains forward references "/base/a/b/file1" as illustrated in the FIG. More specifically, each forward references /base to /a, /a to b, /b to /file 1, and to a specific logical block address, represents a different level of indirection associated with the storage of data. In a file-based storage system (e.g., a log-structure write system), forward references typically involve resolving file name into the associated i-node, followed by the lookup of the media block address in the file management tree by the offset into the file. In a block-based storage system, forward references typically involve volume identification, followed by the traversal of the associated tree or other indexing structure that maps volume address to media address, to identify a physical block matching the volume block address of the user request. Whichever the case, be it i-node/file offset or volume/volume offset, this information provides context to the host to enable forward lookup.

As depicted in FIG. 5F, the reference "/base" in this hypothetical could be stored at LBA 0x10000, which then might contain a pointer or forward reference to location/a at LBA 0x11000, which might contain a forward reference to LBA 0x12000, and from there to a location 0x887512 in a storage drive 563, this location being denoted by numeral 565 in FIG. 5F. Note that in the case of storage drive comprising flash memory, a resident memory controller might further translate address 0x887512 into a physical location (the memory controller and associated translation would thus effectively be part of drive 563). From only the data (567) stored at this location, it would conventionally be difficult to understand which file the data belongs to, or for that matter, to identify context sufficient to plan intelligent storage of that data, or to reconfigure memory or otherwise perform migration for drive optimization purposes.

Reflecting on the embodiments that store/track back references as part of stored metadata, context metadata can be specifically written by the host in association with data writes so as to provide a reference for the host to later derive context for data found at a given physical memory location. Such metadata optionally is accompanied by hashes of the written data (e.g., with such hashes optionally being computed by the memory controller and used for Deduplication). For example as indicated by numeral 569, the stored metadata can include one or more back references or other data as desired to permit the host to ascribe characteristics to data residing at that physical memory location (e.g., an update file references in the event of duplicates). In a relatively straightforward implementation, a back reference can consist of an identifier for an owner object and a logical or other offset within that object; for example, value having two numerical fields could be used to identify these quantities. Alternatively, the context information can include more detailed or sophisticated information that within its body provides "reverse mapping" for underlying data, such as logical address (LBA) and the inverse of any forward references that lead to data being at its current location. For example, FIG. 5F shows "0x887512; 0x12000/file1; 0x11000/b; 0x10000/a; /base" as an example of metadata that provides a string of field-delimited back references sufficient to identify each forward reference used by the host (for example, using other metadata 571 stored by the memory controller or the host). Clearly, many other (and potentially simpler) references can be instead used; numeral 572 for example refers to a two field entry comprising an address (e.g., "0x3FF00") and an offset (e.g., "9C"), which for example could respectively point to a table or file and an offset within that table or file. Other metadata 573 can include other types of information, for example, by way of non-limiting example, a file name or other descriptor or a link or identifier that permits the host to identify data characteristics, file type, or other information. As indicated, back references can be tracked by the memory controller and provided back to the host to facilitate efficient operations in memory. For example, in connection with a deduplication scheme, duplicate data which is to be discarded or purged from memory may have unique back references; when discarding such data, the memory controller advantageously informs the host and provides associated back reference data, such that the host can update it various file references so as to point to a single instance of the data.

Reflecting on the foregoing, what has been described is a memory controller architecture that can facilitate efficient memory operations by performing functions delegated by the host, in a manner that does not create excessive bandwidth competition for host functions. For example, employed in the context of flash memory (or other nonvolatile memory having some or all of the maintenance overhead described earlier), such a system permits a memory controller to cooperate with the host for scheduling purposes, so that the host (and not the memory controller) dictates when time-consuming programming or maintenance operations are to occur. Employed in the context of a pseudo-expositive memory controller, this permits the host to schedule multiple concurrent operations for different "virtual block devices" or "VBDs," all residing under (and managed by) a single, common memory controller, without being impacted by programming (or erasing) latencies that might impact successive operations directed to a common block device.

It should be noted that, as a step in their fabrication or other reification, the various circuits disclosed herein may be described using computer aided design tools and expressed (or represented) as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process. Any of the various methods and operational sequences herein may likewise be recorded as one or more sequences of instructions on a computer-readable medium and may be executed on a computing device to effectuate the disclosed method and/or operational sequence.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, device geometries and numbers of hierarchical structural elements (e.g., channels, dies, planes, erase units, pages, etc.), component circuits or devices and the like may be different from those described above in alternative embodiments. Additionally, links or other interconnection between integrated circuit devices or internal circuit elements or blocks may be shown as buses or as single signal lines. Each of the buses may alternatively be a single signal line, and each of the single signal lines may alternatively be buses. Signals and signaling links, however shown or described, may be single-ended or differential. A signal driving circuit is said to "output" a signal to a signal receiving circuit when the signal driving circuit asserts (or deasserts, if explicitly stated or indicated by context) the signal on a signal line coupled between the signal driving and signal receiving circuits. The term "coupled" is used herein to express a direct connection as well as a connection through one or more intervening circuits or structures. Device "programming" may include, for example and without limitation, loading a control value into a register or other storage circuit within an integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement.

While the invention has been described with reference to specific embodiments thereof, it will be evident that various modifications and changes may be made thereto without departing from the broader spirit and scope. For example, features or aspects of any of the embodiments may be applied in combination with any other of the embodiments disclosed herein and/or in materials incorporated by reference or in place of counterpart features or aspects thereof. Accordingly, the specification and drawings are to be regarded in an illustrative rather than a restrictive sense.

We claim:

1. A memory controller for flash memory, the memory controller comprising:
    at least one interface to receive requests from a host and to transmit commands to one or more flash memory devices, wherein the commands to be transmitted include commands to program data into the one or more flash memory devices; and
    circuitry to compute redundancy information for the data to be programmed, so as to permit recovery of data to be programmed should a storage location corresponding to programming of the data be unavailable;
    wherein the memory controller is not to program the redundancy information into the one or more flash memory devices in connection with the commands to program the data, but is instead to transmit a notification to the host pertaining to the redundancy information, the host in response to the notification to control writing of the redundancy information by explicit request into a memory resource other than the one or more flash memory devices.

2. The memory controller of claim 1, wherein the memory controller comprises circuitry to relocate data from a first location in the one or more flash memory devices to a second location in the one or more flash memory devices without sending the data to be relocated to the host.

3. The memory controller of claim 2, embodied as a memory controller integrated circuit, the flash memory and the host being external to the memory controller integrated circuit.

4. The memory controller of claim 2, wherein the data to be programmed into the one or more memory devices comprises the data to be relocated.

5. The memory controller of claim 1, wherein the requests received from the host include a write request and wherein the data to be programmed into the one or more memory devices includes write data supplied by the host in connection with the write request.

6. The memory controller of claim 5, wherein the redundancy information comprises error correction code (ECC) data.

7. The memory controller of claim 5, wherein the redundancy information comprises redundant array of independent disks (RAID) data.

8. The memory controller of claim 1, wherein the notification to be transmitted to the host comprises the redundancy information.

9. The memory controller of claim 1, wherein the one or more memory devices and the memory controller are embodied together as a solid state drive (SSD), wherein an explicit request is to be sent by the host to the SSD for storage in flash memory other than as represented by the one or more memory devices, and wherein the memory controller is to receive the explicit request from the host via the at least one interface.

10. The memory controller of claim 1, wherein the memory controller further comprises a register to store a value, and wherein the redundancy information is dependent on the value.

11. The memory controller of claim 1, wherein the memory controller further comprises a register to store a value, and wherein for a given set of data to be programmed into the one or more flash memory devices, the circuitry to compute the redundancy information is to do so selectively, dependent on the value.

12. The memory controller of claim 1, wherein:
the one or more flash memory devices are a first set of one or more flash memory devices, the requests from the host are first requests, and the commands to be transmitted to the first set of one or more flash memory devices are first commands;
the flash memory comprises a second set of one or more flash memory devices, the at least one interface is to receive second requests from the host and the memory controller is to transmit second commands to the second set of one or more flash memory devices, including commands to program data into the second set of one or more flash memory devices;
the memory controller further comprises a register to store a value for each of the first set of one or more flash memory devices and the second set of one or more flash memory devices; and
the circuitry to compute the redundancy information is to do so for the first set of one or more flash memory devices dependent on the value stored in the register for the first set of one or more flash memory devices, and is to compute redundancy information for the second set of one or more flash memory devices dependent on the value stored in the register for the second set of flash memory devices, such that redundancy information is computed differently for the first set of one or more flash memory device than the second set of one or more flash memory devices, depending on the value for each of the first set and the second set.

13. The memory controller of claim 1, wherein the circuitry to compute the redundancy information is to do so for multiple respective data sets to be programmed into the one or more flash memory devices, and wherein the memory controller is to transmit the notification once the redundancy information has been computed for the multiple respective data sets.

14. The memory controller of claim 13, wherein the notification comprises the redundancy information for the multiple respective data sets.

15. A memory apparatus comprising:
flash memory including one or more flash memory devices; and
a memory controller for flash memory, the memory controller comprising
at least one interface to receive requests from a host and to transmit commands to one or more flash memory devices, wherein the commands to be transmitted include commands to program data into the one or more flash memory devices, and
circuitry to compute redundancy information for the data to be programmed, so as to permit recovery of data to be programmed should a storage location corresponding to programming of the data be unavailable,
wherein the memory controller is not to program the redundancy information into the one or more flash memory devices in connection with the commands to program the data, but is instead to transmit a notification to the host pertaining to the redundancy information, the host in response to the notification to control writing of the redundancy information by explicit request into a memory resource other than the one or more flash memory devices.

16. The memory apparatus of claim 15, wherein the memory controller comprises circuitry to relocate data from a first location in the one or more flash memory devices to a second location in the one or more flash memory devices without sending the data to be relocated to the host.

17. The memory apparatus of claim 16, wherein the memory controller is embodied as a memory controller integrated circuit, the flash memory and the host being external to the memory controller integrated circuit.

18. The memory apparatus of claim 16, wherein the data to be programmed into the one or more memory devices comprises the data to be relocated.

19. The memory apparatus of claim 15, wherein the requests received from the host include a write request and wherein the data to be programmed into the one or more memory devices includes write data supplied by the host in connection with the write request.

20. The memory apparatus of claim 15, wherein the notification to be transmitted to the host comprises the redundancy information.

21. The memory apparatus of claim 15, wherein the explicit request is to be sent by the host to the SSD for storage in flash memory other than as represented by the one or more memory devices, and wherein the memory controller is to receive an explicit request from the host via the at least one interface.

22. The memory apparatus of claim 15, wherein the memory controller further comprises a register to store a value, and wherein the redundancy information is dependent on the value.

23. The memory apparatus of claim 15, wherein the memory controller further comprises a register to store a value, and wherein for a given set of data to be programmed into the one or more flash memory devices, the circuitry to compute the redundancy information is to do so selectively, dependent on the value.

24. The memory apparatus of claim 15, wherein:
the one or more flash memory devices are a first set of one or more flash memory devices, the requests from the host are first requests, and the commands to be transmitted to the first set of one or more flash memory devices are first commands;
the flash memory comprises a second set of one or more flash memory devices, the at least one interface is to receive second requests from the host and the memory controller is to transmit second commands to the second set of one or more flash memory devices, including commands to program data into the second set of one or more flash memory devices;
the memory controller further comprises a register to store a value for each of the first set of one or more flash memory devices and the second set of one or more flash memory devices; and
the circuitry to compute the redundancy information is to do so for the first set of one or more flash memory devices dependent on the value stored in the register for the first set of one or more flash memory devices, and is to compute redundancy information for the second set of one or more flash memory devices dependent on the value stored in the register for the second set of flash memory devices, such that redundancy information is computed differently for the first set of one or more flash memory device than the second set of one or more flash memory devices, depending on the value for each of the first set and the second set.

25. A memory controller integrated circuit for flash memory, the memory controller integrated circuit comprising:
at least one interface to receive requests from a host and to transmit commands to one or more flash memory devices, wherein the commands to be transmitted include commands to program data into the one or more flash memory devices; and
circuitry to compute redundancy information for the data to be programmed, so as to permit recovery of data to be programmed should a storage location corresponding to programming of the data be unavailable;
wherein the memory controller is not to program the redundancy information into the one or more flash memory devices in connection with the commands to program the data, but is instead to transmit a notification to the host pertaining to the redundancy information, the notification providing the redundancy information to the host, the host in response to the notification to control writing of the redundancy information by explicit request into a memory resource other than the one or more flash memory devices.

* * * * *